United States Patent
Li et al.

(10) Patent No.: US 12,389,063 B2
(45) Date of Patent: Aug. 12, 2025

(54) INTERFACE DISPLAY METHOD, DEVICE, AND MEDIUM FOR GENERATING AN INTERACTION EFFECT CORRESPONDING TO PRESET STATE

(71) Applicant: Beijing Zitiao Network Technology Co., Ltd., Beijing (CN)

(72) Inventors: Yijie Li, Beijing (CN); Xu Chen, Beijing (CN); Jing Tang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/763,459

(22) Filed: Jul. 3, 2024

(65) Prior Publication Data

US 2024/0364958 A1    Oct. 31, 2024

Related U.S. Application Data

(63) Continuation of application No. PCT/CN2023/070039, filed on Jan. 3, 2023.

(30) Foreign Application Priority Data

Jan. 5, 2022   (CN) .......................... 202210006909.2

(51) Int. Cl.
   *H04N 5/445*   (2011.01)
   *G06F 3/00*    (2006.01)
   (Continued)

(52) U.S. Cl.
   CPC ..... *H04N 21/4312* (2013.01); *H04N 21/2187* (2013.01); *H04N 21/4788* (2013.01)

(58) Field of Classification Search
   CPC .......... H04N 21/4312; H04N 21/2187; H04N 21/4788
   See application file for complete search history.

(56) References Cited

U.S. PATENT DOCUMENTS

| | | |
|---|---|---|
| 10,684,738 B1 | 6/2020 | Sicora et al. |
| 2017/0003784 A1 | 1/2017 | Garg et al. |

(Continued)

FOREIGN PATENT DOCUMENTS

| | | |
|---|---|---|
| CN | 105472468 A | 4/2016 |
| CN | 105554523 A | 5/2016 |

(Continued)

OTHER PUBLICATIONS

International Search Report and Written Opinion received for PCT/CN2023/070039, mailed Jun. 8, 2023.

(Continued)

*Primary Examiner* — Gigi L Dubasky
(74) *Attorney, Agent, or Firm* — Astute IP Law Group

(57) ABSTRACT

The present disclosure discloses an interface display method and apparatus, a computer device, and a storage medium, and the interface display method is applied to a first client and includes: during a first period when a livestreaming room is in a preset state, in response to receiving an interaction trigger operation for the livestreaming room, determining, according to the interaction trigger operation, target interaction information corresponding to the preset state, the target interaction information being different from actual interaction information corresponding to the interaction trigger operation; and based on the target interaction information, generating an interaction effect corresponding to the preset state, and displaying the interaction effect.

18 Claims, 11 Drawing Sheets

(51) Int. Cl.
*G06F 13/00* (2006.01)
*H04N 21/2187* (2011.01)
*H04N 21/431* (2011.01)
*H04N 21/4788* (2011.01)

(56) References Cited

U.S. PATENT DOCUMENTS

| | | | |
|---|---|---|---|
| 2019/0115034 A1 | 4/2019 | Frett et al. | |
| 2022/0321974 A1* | 10/2022 | Zang | H04N 21/4788 |
| 2023/0125331 A1* | 4/2023 | Li | H04N 21/2187 |

FOREIGN PATENT DOCUMENTS

| | | |
|---|---|---|
| CN | 106250046 A | 12/2016 |
| CN | 106789596 A | 5/2017 |
| CN | 304261447 S | 8/2017 |
| CN | 108924662 A | 11/2018 |
| CN | 110225408 A | 9/2019 |
| CN | 111182318 A | 5/2020 |
| CN | 306647834 S | 6/2021 |
| CN | 113158114 A | 7/2021 |
| CN | 306855866 S | 9/2021 |
| CN | 113766290 A | 12/2021 |
| CN | 114390308 A | 4/2022 |
| CN | 114390308 B | 1/2024 |
| JP | 2012120098 A | 6/2012 |
| JP | 2018005320 A | 1/2018 |
| JP | 2018171283 A | 11/2018 |
| JP | 2019176887 A | 10/2019 |
| WO | 2021259301 A1 | 12/2021 |

OTHER PUBLICATIONS

Yu Tieshan, "Theatre Performance and Emotional Involvement: Research on the phenomenon of gift rewards in online live broadcasts—Based on the analysis of more than 30 typical cases". (2020), (16 Pages Total).
Office Action for Chinese Patent Application No. 202210006909.2, mailed Jun. 17, 2023.
Notice of Reasons for Refusal for Japanese Patent Application No. 2024-540718, mailed on Dec. 17, 2024, 10 pages.
"The Gift function begins!", Mirrativ [Online], The Wayback Machine, Web archive as of Dec. 14, 2018, [Retrieved Sep. 14, 2020], https://web.archive.org/web/20181214025245/https://mirrativtmbr.tumblr.com/post/178631446, 18 pages.

* cited by examiner

During a first period when a livestreaming room is in a preset state, in response to receiving an interaction trigger operation for the livestreaming room, determining, according to the interaction trigger operation, target interaction information corresponding to the preset state ~ S10

Based on the target interaction information, generating an interaction effect corresponding to the preset state, and displaying the interaction effect ~ S11

Fig. 1A

After a livestreaming room is in a preset state, in response to receiving a like trigger operation for the livestreaming room, determining, according to the like trigger operation, target like information corresponding to the preset state ~ S110

Based on the target like information, generating a like effect corresponding to the preset state, and displaying the like effect at a first preset position of a current livestreaming room screen ~ S120

Fig. 1B

INTERFACE DISPLAY METHOD, DEVICE, AND MEDIUM FOR GENERATING AN INTERACTION EFFECT CORRESPONDING TO PRESET STATE

CROSS-REFERENCE TO RELATED APPLICATION

The present application is a continuation of International Patent Application No. PCT/CN2023/070039, filed on Jan. 3, 2023, which claims priority of the Chinese Patent Application No. 202210006909.2, filed on Jan. 5, 2022, and the entire content disclosed by the aforementioned patent applications is incorporated herein by reference as part of the present application.

TECHNICAL FIELD

Embodiments of the present application relate to an interface display method and apparatus in a livestreaming process, a device, a medium, and a product.

BACKGROUND

At present, during a livestreaming process, a user can give a like by triggering a like control or triggering a livestreaming room screen, and accordingly, a drifting like animation is displayed on the livestreaming room screen.

However, regarding giving a like in the livestreaming room in the related arts, the interactive mode is single, and the giving a like is poor in flexibility and display effect, which cannot meet the needs of users for diversity, resulting in poor user experience.

SUMMARY

The present application provides an interface display method and apparatus in a livestreaming process, a device, a medium, and a product, so as to improve the flexibility of display of the livestreaming room, enrich the display effect, and improve the user experience.

In a first aspect, embodiments of the present application provide an interface display method in a livestreaming process, which is applied to an audience terminal, and the method includes:
   after a livestreaming room is in a preset state, in response to receiving a like trigger operation for the livestreaming room, determining, according to the like trigger operation, target like information corresponding to the preset state, the target like information being different from actual like information corresponding to the like trigger operation; and
   based on the target like information, generating a like effect corresponding to the preset state, and displaying the like effect at a first preset position of a current livestreaming room screen.

Embodiments of the present application provide another interface display method, which is applied to a first client, and the method includes:
   during a first period when a livestreaming room is in a preset state, in response to receiving an interaction trigger operation for the livestreaming room, determining, according to the interaction trigger operation, target interaction information corresponding to the preset state, the target interaction information being different from actual interaction information corresponding to the interaction trigger operation; and
   based on the target interaction information, generating an interaction effect corresponding to the preset state, and displaying the interaction effect.

In a second aspect, embodiments of the present application further provide an interface display method in a livestreaming process, which is applied to an audience terminal or an anchor terminal, and the method includes:
   generating, after a livestreaming room is in a preset state, a drifting like animation corresponding to the preset state, the drifting like animation being an effect animation for representing a like popularity of the livestreaming room, and the drifting like animation being different from a drifting like animation displayed when the livestreaming room is not in the preset state; and
   displaying the drifting like animation corresponding to the preset state on a current livestreaming room screen.

Embodiments of the present application further provide an interface display method, which is applied to a first client or a second client, and the method includes:
   generating, during a first period when a livestreaming room is in a preset state, an animation corresponding to the preset state, the animation being an effect animation for representing a like popularity of the livestreaming room, and the animation being different from an animation displayed during a second period when the livestreaming room is not in the preset state; and
   displaying the animation corresponding to the preset state.

In a third aspect, embodiments of the present application further provide an interface display apparatus in a livestreaming process, which is configured at an audience terminal, and the apparatus comprises:
   an information determination module, configured to: after a livestreaming room is in a preset state, in response to receiving a like trigger operation for the livestreaming room, determine, according to the like trigger operation, target like information corresponding to the preset state, the target like information being different from actual like information corresponding to the like trigger operation; and
   an information display module, configured to: based on the target like information, generate a like effect corresponding to the preset state, and display the like effect at a first preset position of a current livestreaming room screen.

In a fourth aspect, embodiments of the present application further provide an interface display apparatus in a livestreaming process, which is configured at an audience terminal or an anchor terminal, and the apparatus comprises:
   an animation generation module, configured to generate, after a livestreaming room is in a preset state, a drifting like animation corresponding to the preset state, the drifting like animation being an effect animation for representing a like popularity of the livestreaming room, and the drifting like animation being different from a drifting like animation displayed when the livestreaming room is not in the preset state; and
   an animation display module, configured to display the drifting like animation corresponding to the preset state on a current livestreaming room screen.

In a fifth aspect, embodiments of the present application further provide a computer device, comprising a memory, a processor, and a computer program stored in the memory and executable on the processor, when the processor executes the computer program, the interface display method as described in any embodiment of the present application is implemented.

In a sixth aspect, embodiments of the present application further provide a non-transitory computer-readable storage medium, the non-transitory computer-readable storage medium storing a computer program, when the computer program is executed by a processor, the interface display method as described in any embodiment of the present application is implemented.

In a seventh aspect, embodiments of the present application further provide a computer program product, comprising a computer program, when the computer program is executed by a processor, the interface display method as described in any embodiment of the present application is implemented.

BRIEF DESCRIPTION OF DRAWINGS

Throughout the accompanying drawings, the same or similar reference numerals indicate the same or similar elements. It should be understood that the accompanying drawings are schematic and that components and elements are not necessarily drawn to scale.

FIG. 1A is a schematic flowchart of an interface display method provided by an embodiment of the present disclosure;

FIG. 1B is a schematic flowchart of an interface display method provided by another embodiment of the present disclosure;

DETAILED DESCRIPTION

Figure 2:
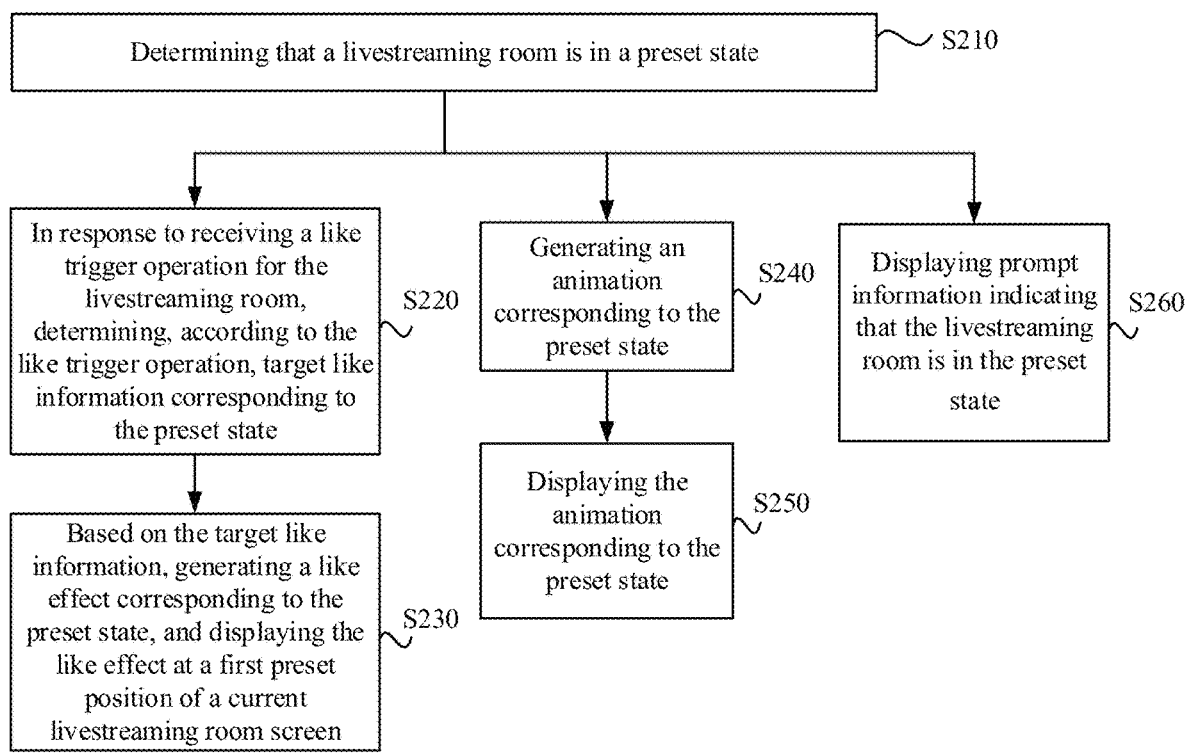
FIG. 2 is a schematic flowchart of an interface display method provided by an embodiment of the present disclosure.

It should be understood that various steps recorded in the implementation modes of the methods of the present disclosure can be performed according to different orders and/or performed in parallel. In addition, the implementation modes of the methods can include additional steps and/or omit performing the steps shown. The scope of the present disclosure is not limited in this aspect.

The term "comprise/include" and variations thereof used in this article are open-ended inclusion, namely "comprising/including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that the concepts, such as "first" and "second", mentioned in the present disclosure are only used to distinguish different apparatuses, modules, or units, and are not intended to limit orders or interdependence relationships of functions performed by these apparatuses, modules, or units.

It should be noted that the modifications of "one" and "more/plurality" mentioned in the present disclosure are illustrative rather than restrictive, and those skilled in the art should understand that unless otherwise explicitly stated in the context, it should be understood as "at least one".

The names of messages or information interacted between a plurality of apparatuses in the implementations of the present disclosure are used for illustrative purposes only and are not used to limit the scope of such messages or information.

FIG. 1A is a schematic flowchart of an interface display method provided by an embodiment of the present disclosure, FIG. 1B is a schematic flowchart of an interface display method provided by another embodiment of the present disclosure. The embodiment of the present disclosure is suitable for a first client, such as an audience terminal, and the embodiment of the present disclosure is used to display an outstanding effect on an interface of a livestreaming room in a case of the presence of group liking when audiences give likes in the livestreaming room in the livestreaming process. This method can be executed by an interface display apparatus, and this apparatus can be implemented in a form of software and/or hardware, or alternatively, by a computer device, and the computer device may be a mobile terminal, a PC, or a server, etc.

For example, the interface display method can be used in a livestreaming process.

As shown in FIG. 1A, in an embodiment, the method includes:

S10: during a first period when a livestreaming room is in a preset state, in response to receiving an interaction trigger operation for the livestreaming room, determining, according to the interaction trigger operation, target interaction information corresponding to the preset state.

S11: based on the target interaction information, generating an interaction effect corresponding to the preset state, and displaying the interaction effect.

For example, the target interaction information is different from actual interaction information corresponding to the interaction trigger operation.

For example, the interaction effect is displayed at a first preset position of a current livestreaming room screen.

In some examples, the interaction trigger operation comprises a like trigger operation, the target interaction information comprises target like information, the actual interaction information comprises actual like information, the interaction effect comprises a like effect. In the following, taking the case that the interaction trigger operation comprises a like trigger operation, the target interaction information comprises target like information, the actual interaction information comprises actual like information, the interaction effect comprises a like effect as an example for description.

As shown in FIG. 1B, in another embodiment, the method includes:

S110: after a livestreaming room is in a preset state, in response to receiving a like trigger operation for the livestreaming room, determining, according to the like trigger operation, target like information corresponding to the preset state.

The preset state may be a state generated when there are group liking, for example, a like boost state, a like continuation state, etc. The livestreaming room screen may be a livestreaming interface of the livestreaming room. Interactive controls such as a comment control and a like control can be displayed on the livestreaming room screen, and interactive information such as comment information of audiences can also be displayed on the livestreaming room screen. The like control can be a button or the like displayed on the livestreaming room screen to give a like in the livestreaming room. The like trigger operation may be an operation of triggering the like control, but it is not limited to this, and it may also be a trigger operation acting on the livestreaming room screen, such as an operation of clicking on a set position corresponding to liking on the screen, and the set position may be any position on the screen. The actual like information may be actual information of likes generated after an audience triggers a screen, for example, an actual number of likes, an actual like duration, an actual like frequency, etc. The target like information is different from the actual like information corresponding to the like trigger operation, and the target like information may be greater than or less than the actual like information, for example, the target like information may be like information obtained after calculating and processing the actual like information, etc.

It should be noted that the target like information corresponding to the preset state is determined according to the like trigger operation, the target like information is different from the actual like information corresponding to the like trigger operation, the actual like information may be actual like information corresponding to the like trigger operation, the target like information may be a target number of likes, and the actual like information may be an actual number of likes. For example, the preset state is a like boost state, and may exemplarily be a like double boost state. Then, the actual number of likes may be the same as a number of trigger operations, and the target number of likes corresponds to the like double boost state, namely may be two times the number of trigger operations, that is, two times the actual number of likes (the target like information may be a result of the boost of the actual like information). Certainly, it may also be triple boost for likes and so on, and correspondingly, the target number of likes corresponds to a state of triple boost for likes, that is, may be the same as three times the number of trigger operations. Moreover, it may be quadruple boost, quintuple boost, etc., which is similar to the above description and will not be repeated here.

Exemplarily, after the livestreaming room enters the preset state, the trigger operations for giving likes for the livestreaming room screen are received from the audience terminal. Furthermore, the trigger operations corresponding to the audience terminal are counted, data processing is performed on statistical results, and the data-processed like information is taken as the target like information.

Exemplarily, by counting the trigger operations corresponding to the audience terminal, the actual like information of the current audience terminal may be obtained, and then the data processing is performed on the actual like information, for example, processing the actual like information through preset functions and the like, to obtain the target like information, so that the target like information is different from the actual like information.

S120: based on the target like information, generating a like effect corresponding to the preset state, and displaying the like effect at a first preset position of a current livestreaming room screen.

The like effect may be a text effect, a picture effect, and/or an animation effect, and so on prompting the target like information. The current livestreaming room screen may be a livestreaming room screen that the audience is watching at a current moment. The first preset position may be any preset position in the current livestreaming room screen, for example, directly in a middle of the livestreaming room screen, at a lower right corner of the livestreaming room screen, etc.

It should be noted that the like effect corresponding to the preset state may be a first like effect, and a like effect corresponding to a non-preset state (that is, the livestreaming room is not in the preset state) may be a second like effect; the first like effect may be a result of like boost, for example, the boost of the first like effect may be double boost, triple boost, and so on, and the first like effect corresponds to the like boost state. It can be seen from the above that the first like effect also corresponds to the target like information, both of the first like effect and the target like information correspond to the preset state of the livestreaming room at the same time.

Exemplarily, after the target like information is determined, a corresponding like effect may be generated according to the target like information. Moreover, the first preset position for displaying the like effect on the current livestreaming room screen may be determined, so as to display the like effect at the first preset position.

Exemplarily, the like effect is scrolling text information corresponding to the target like information, and the first preset position may be directly above the current livestreaming room screen; and at this time, the target like information may be displayed in a scrolling manner directly above the current livestreaming room screen, for example, "like double boosting!", "10×2 likes!" The like effect is a like image corresponding to the target like information, and the target like information is marked on the like image. The first preset position may be directly in the middle of the current livestreaming room screen, and at this time, the like image and the target like information may be displayed directly in the middle of the current livestreaming room screen, for example, a double like image is displayed directly in the middle of the current livestreaming room screen, and "10× 2!" is displayed below the like image.

It should be noted that when the like effect generated according to the target like information is displayed at the first preset position, the audience may see the like effect at the audience terminal and know that the livestreaming room has entered the preset state at this time, so as to be guided to continue to give likes.

In the present application, after a livestreaming room enters a preset state, in response to receiving a like trigger operation for the livestreaming room, target like information corresponding to the preset state is determined according to the like trigger operation, the target like information is different from actual like information corresponding to the like trigger operation; based on the target like information, a like effect corresponding to the preset state is generated, and is displayed at a first preset position of a current livestreaming room screen. Thus, the problems of single interactivity when users like and low user experience in the related arts are solved, and the technical effects of improving the flexibility of a video playing interface in responding to the like effect, enriching the diversified needs of users, and improving the user experience are implemented.

FIG. 2 is a schematic flowchart of an interface display method provided by an embodiment of the present disclosure. On the basis of the aforementioned embodiment, a method for determining and displaying a drifting like animation after the livestreaming room enters a preset state and a method for displaying prompt information for entering the preset state are added. For its specific implementations, reference may be made to the detailed description of this technical solution. Technical terms that are the same as or corresponding to those in the above embodiments are omitted here.

As shown in FIG. 2, the method includes:

S210: determining that a livestreaming room is in a preset state.

S220: in response to receiving a like trigger operation for the livestreaming room, determining, according to the like trigger operation, target like information corresponding to the preset state.

The target like information is different from actual like information corresponding to the like trigger operation.

Exemplarily, after the livestreaming room enters the preset state, trigger operations for giving likes for the livestreaming room screen are received from the audience terminal, the trigger operations corresponding to the audience terminal are counted, and data processing is performed on statistical results, and the data-processed like information is taken as the target like information.

On the basis of this embodiment, optionally, the target like information includes a target number of likes and the actual like information includes an actual number of likes; and the target number of likes is greater than the actual number of likes.

Exemplarily, after the livestreaming room enters the preset state, in response to receiving the like trigger operation for the livestreaming room, the actual number of likes may be determined, and the target number of likes greater than the actual number of likes may be determined.

S230: based on the target like information, generating a like effect corresponding to the preset state, and displaying the like effect at a first preset position of a current livestreaming room screen.

Exemplarily, a corresponding like effect is generated according to the target like information, and the first preset position for displaying the like effect on the current livestreaming room screen may be determined, so as to display the like effect at the first preset position.

On the basis of this embodiment, optionally, the target number of likes is N times the actual number of likes, and N is an integer greater than or equal to 2; and the like effect includes prompt information for N like figures and/or prompt information for doubling the number of likes. For example, the prompt information may be a prompt text or a prompt icon.

The like figure may be a preset figure showing a like effect, for example, a thumb figure, etc. The prompt information may be a text used to prompt that it is now in a state of doubling the number of likes, for example, "like doubling", "×2", etc.

Exemplarily, after the livestreaming room enters the preset state, in response to receiving trigger operations for giving likes for the livestreaming room screen, the actual number of likes may be determined, and is doubled to obtain the target number of likes. Furthermore, based on the target like information, prompt information for doubled like figures and/or prompt information for doubling the number of likes are/is generated to display the like effect at the first preset position.

Figure 3:
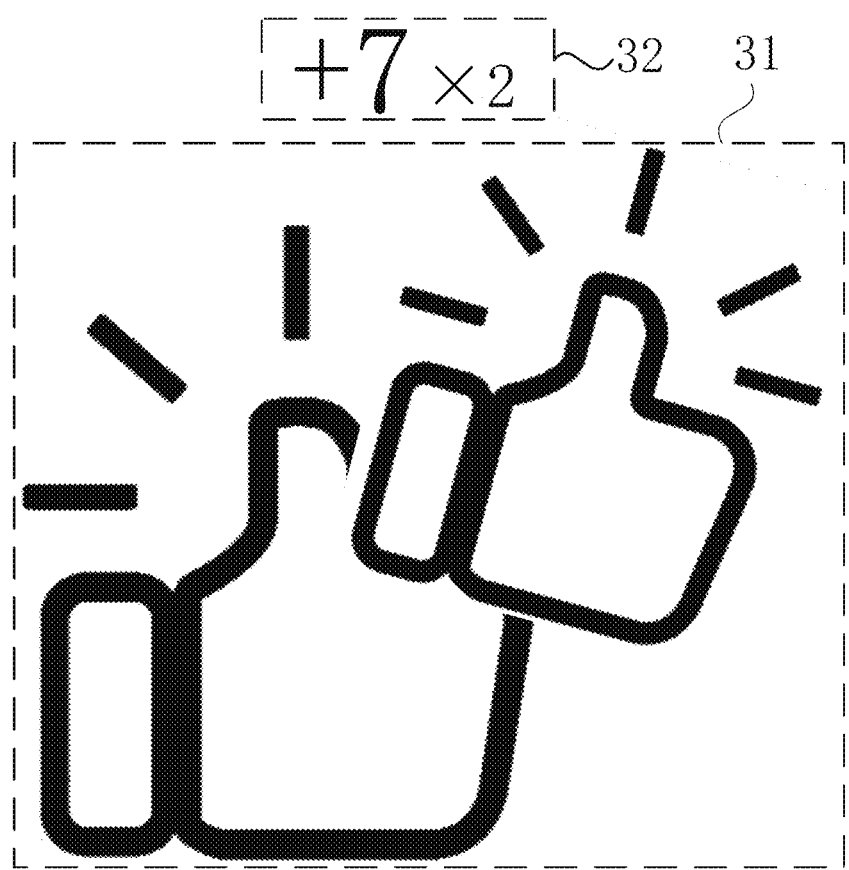
FIG. 3 is a schematic diagram of a like effect in a double-like boost state provided by an embodiment of the present disclosure.

Exemplarily, a like effect in a double-like boost state is shown in FIG. 3. Currently in the double boost for the number of likes, that is, N=2, and the actual number of likes is 7, at this time, the target number of likes is 7×2. Accordingly, a superposition effect diagram of two like figures is displayed, that is, including N like FIG. 31, and a prompt text "7×2", that is, the prompt text 32 for prompting doubling of the number of likes, is displayed.

Optionally, the copied like figure in the like effect may be a preset multiple of an original like figure, for example, 0.8 times. There may also be a plane misalignment between the copied like figure and the original like figure, for example, a position difference (such as an offset by 8 pixels, etc.), an angle difference (such as a rotation of 15 degrees, etc.), or the like. Dynamic effects of appearing and/or disappearing can also be added into the copied like figure and the original like figure in a display process.

S240: generating an animation corresponding to the preset state.

For example, the step S240 is performed during the first period when the livestreaming room is in the preset state.

In an embodiment, the animation is a drifting like animation. The drifting like animation is an effect animation for representing a like popularity of the livestreaming room, and the drifting like animation is different from a drifting like animation displayed when the livestreaming room is not in the preset state.

It should be noted that the drifting like animation corresponding to the preset state may be a first drifting like animation, and a drifting like animation corresponding to a non-preset state (that is, the livestreaming room is not in the preset state) may be a second drifting like animation; and the first drifting like animation may be a result of like boost, for example, the boost for the first drifting like animation may be double boost, triple boost, etc., and the first drifting like animation corresponds to the like boost state. It can be seen from the above that the first drifting like animation also corresponds to the target like information, both of the first drifting like animation and the target like information correspond to the preset state of the livestreaming room at the same time.

Exemplarily, after the livestreaming room enters the preset state, the corresponding drifting like animation is generated according to the current preset state, so as to be displayed later.

S250: displaying the animation corresponding to the preset state.

Exemplarily, the animation (such as the drifting like animation) corresponding to the preset state is displayed on the current livestreaming room screen, so that the audience can see the animation corresponding to the preset state.

Figure 4:
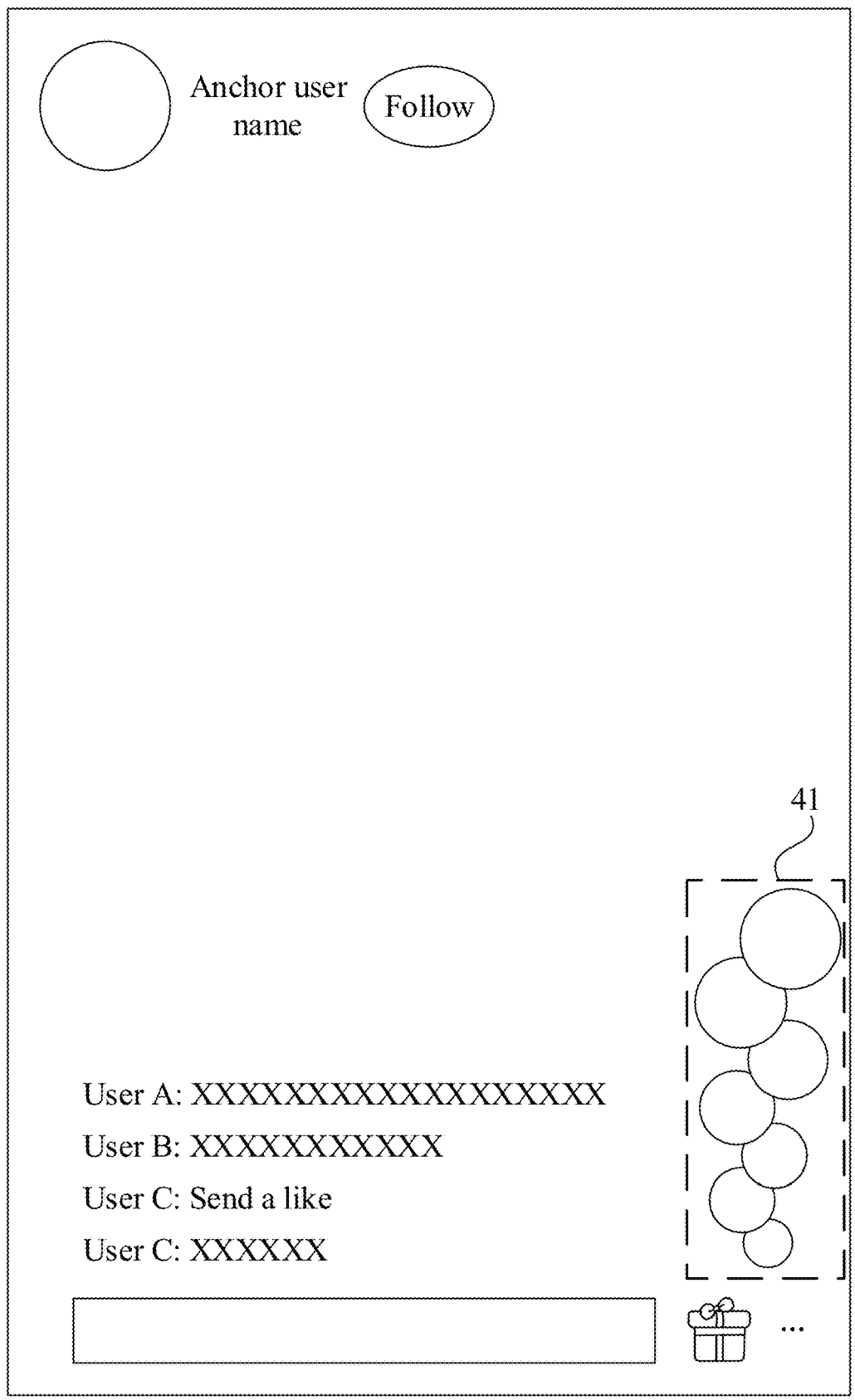
FIG. 4 is a schematic diagram of a drifting like animation in a preset state provided by an embodiment of the present disclosure.

Exemplarily, when the livestreaming room does not enter the preset state, the drifting like animation is that circular bubbles appear gently, sizes of the circular bubbles remain constant. When the livestreaming room enters the preset state, the drifting like animation is that the circular bubbles appear at an accelerated speed, showing a dynamic effect of volcanic eruption, in which the circular bubbles change from small to large. The circular bubbles may also be modified into colored ball shapes and so on. In the preset state, the drifting like animation is shown in FIG. 4, and the circular bubbles in the shape of volcanic eruption in the lower right corner of FIG. 4 may be regarded as a drifting like animation 41.

On the basis of this embodiment, optionally, the drifting like animation in the preset state may be expanded and displayed, for example, by determining association information of a target object corresponding to the livestreaming room; and displaying the association information of the target object in the displayed drifting like animation corresponding to the preset state.

The target object is at least one object whose number of likes reaches a preset like number threshold or whose number of likes is the highest. The preset like number threshold may be set according to an actual situation of the livestreaming room or platform requirements, which is not limited in this embodiment. The association information includes an identification of the target object and/or the number of likes of the target object. The identification may be a nickname, avatar, etc. of the target object.

Exemplarily, the target object is determined from the audiences who give likes in the livestreaming room. Furthermore, the association information of the target object is determined, and the association information of the target object is displayed in the drifting like animation corresponding to the preset state, so as to encourage the audiences to participate in the like interaction.

Figure 5:
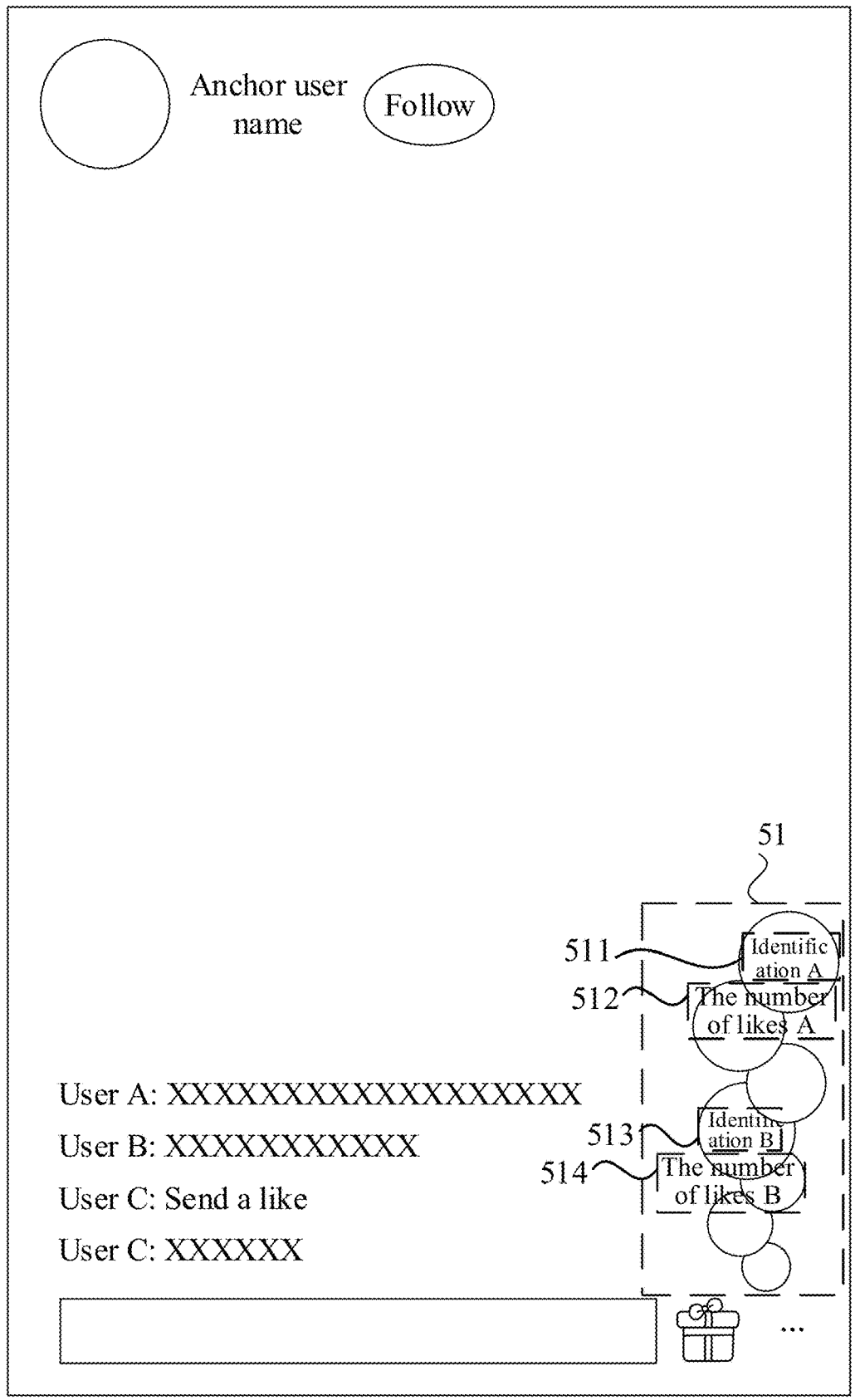
FIG. 5 is a schematic diagram of a drifting like animation including association information of a target object provided by an embodiment of the present disclosure.

Exemplarily, a schematic diagram of a drifting like animation including association information of a target object is shown in FIG. 5. The target objects are objects with like numbers ranked in the top two. Then, in the drifting like animation 51 in the lower right corner of the livestreaming room screen as shown in FIG. 5, an identification A and a number of likes A (512 in the figure) of a target object A (511 in the figure), and an identification B and a number of likes B (514 in the figure) of the target object B (513 in the figure) are displayed, the identification A and the identification B are identifications of the target objects, and the number of likes A and the number of likes B are numbers of likes of the target objects.

S260: displaying prompt information indicating that the livestreaming room is in the preset state.

For example, the step S260 is performed during the first period when the livestreaming room is in the preset state, the prompt information indicating that the livestreaming room is in the preset state is displayed at a second preset position of the current livestreaming room screen. The second preset position may be any preset position in the current livestreaming room screen, for example, directly in a middle of the livestreaming room screen, directly above the livestreaming room screen, etc. The prompt information indicating that the livestreaming room is in the preset state may be text information, animation information, etc. used to prompt that the livestreaming room is in the preset state.

Exemplarily, after the livestreaming room enters the preset state, the second preset position in the current livestreaming room screen is determined, and prompt information indicating that the livestreaming room is in the preset state is displayed at the second preset position to remind the audiences that the current livestreaming room is in the preset state.

Figure 6:
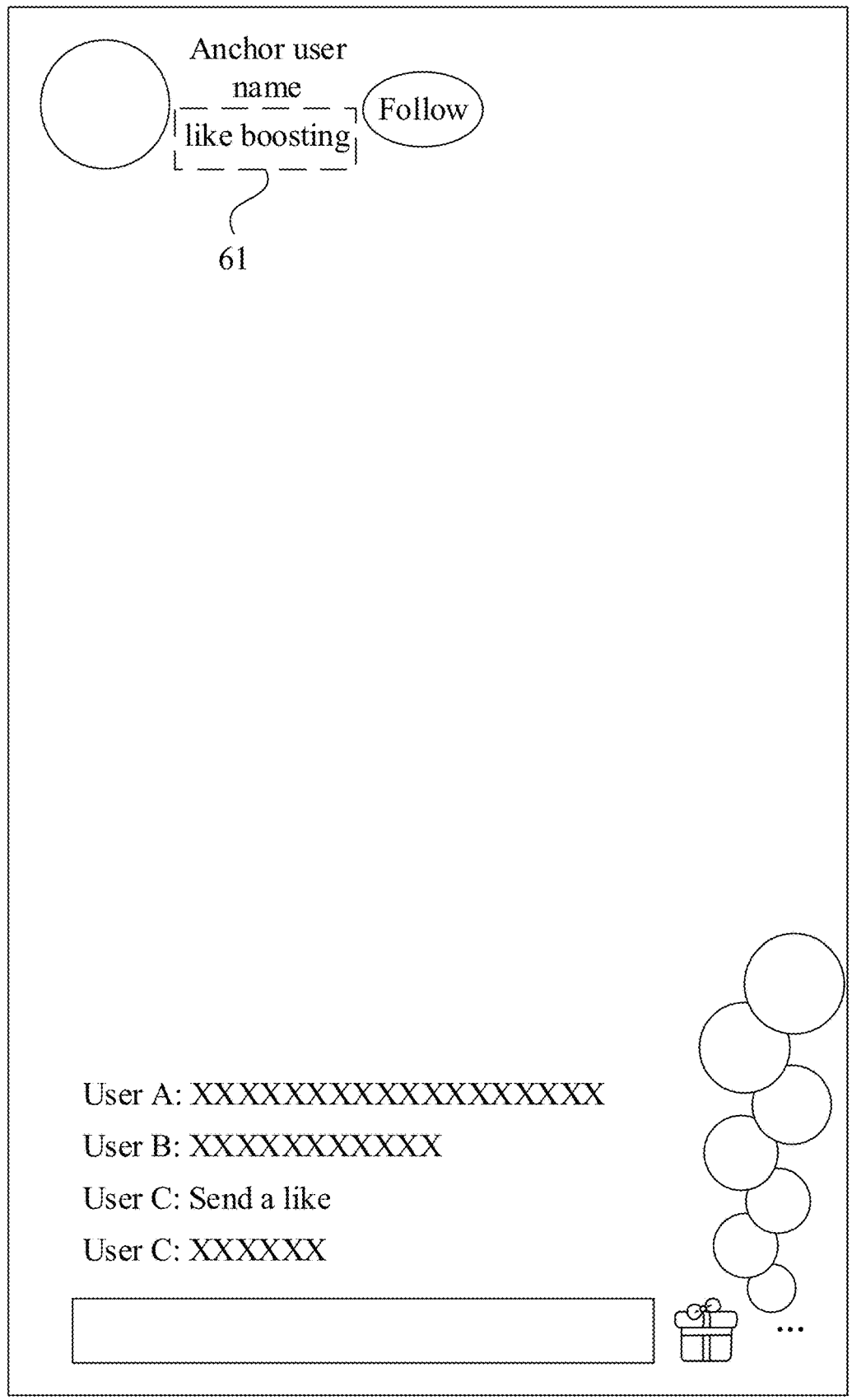
FIG. 6 is a schematic diagram of prompt information indicating that a livestreaming room is in a preset state in a livestreaming room screen provided by an embodiment of the present disclosure.

Exemplarily, a schematic diagram for displaying the prompt information indicating that the livestreaming room is in a preset state in a livestreaming room screen is shown in FIG. 6, the second preset position is a position below an anchor user name, and "like boosting" 61 is the prompt information indicating that the livestreaming room is in the preset state.

On the basis of the above embodiments, the prompt information indicating that the livestreaming room is in a preset state may be highlighted by the following steps:

Step one: displaying in a scrolling manner the prompt information indicating that the livestreaming room is in the preset state at the second preset position of the current livestreaming room screen, and ending the scrolling display of the prompt information when a display duration of the prompt information reaches a first preset duration.

The display duration is a duration for displaying the prompt information indicating that the livestreaming room is in the preset state. The first preset duration may be a preset stage duration for displaying the prompt information indicating that the livestreaming room is in the preset state.

Exemplarily, at the second preset position of the current livestreaming room screen, the prompt information indicating that the livestreaming room is in the preset state is displayed in a scrolling manner, so as to prompt the audiences that the current livestreaming room is in the preset state. When the display duration of the prompt information reaches the first preset duration, it means that the prompt information has displayed continuously for a period of time, and the scrolling display of the prompt information may be ended first. And subsequently, it can also be determined whether the livestreaming room is in the preset state, and then whether the prompt information is displayed in a scrolling manner again may be determined.

Step two: determining whether the livestreaming room is still in the preset state after a second preset duration, and in response to the livestreaming room being still in the preset state, returning to perform an operation of displaying in the scrolling manner the prompt information indicating that the livestreaming room is in the preset state at the second preset position of the current livestreaming room screen.

The second preset duration may be a preset duration after the scrolling display of the prompt information indicating that the livestreaming room is in the preset state is ended, and is used for triggering to detect whether the livestreaming room is still in the preset state.

Exemplarily, after the second preset duration, whether the livestreaming room is still in the preset state is detected; in response to the livestreaming room being still in the preset state, the prompt information indicating that the livestreaming room is in the preset state needs to be displayed again, and thus, it is possible to return to perform the operation of displaying in the scrolling manner the prompt information indicating that the livestreaming room is in the preset state at the second preset position of the current livestreaming room screen; and in response to the livestreaming room being not in the preset state, the display of the prompt information indicating that the livestreaming room is in the preset state and continuous detection is completely stopped.

It should be noted that the execution order of S220-S230, S240-S250, and S260 may be executed simultaneously or sequentially, and the execution order is not limited in this embodiment.

On the basis of the above embodiments, at least one of the following operations may be performed when the preset state of the livestreaming room is ended:

Operation one: displaying prompt information including the total number of likes given by users during the period when the livestreaming room is in the preset state at a third preset position of the current livestreaming room screen.

The third preset position may be any preset position in the current livestreaming room screen, for example, directly in a middle of the livestreaming room screen, directly above the livestreaming room screen, and so on, or in a comment region. Users may be audiences of the livestreaming room. The prompt information of the total number of likes may be text information, animation information, etc. of the total number of likes determined during the period when the livestreaming room is in the preset state.

Exemplarily, when the preset state of the livestreaming room is ended, the total number of likes given by users during the period when the livestreaming room is in the preset state is determined, and the prompt information including the total number of likes given by users during the period when the livestreaming room is in the preset state is generated. Furthermore, the third preset position of the current livestreaming room screen is determined, and the prompt information of the total number of likes given by users during the period when the livestreaming room is in the preset state is displayed at the third preset position, so as to encourage the audiences to follow and give likes to the livestreaming room.

Figure 7:
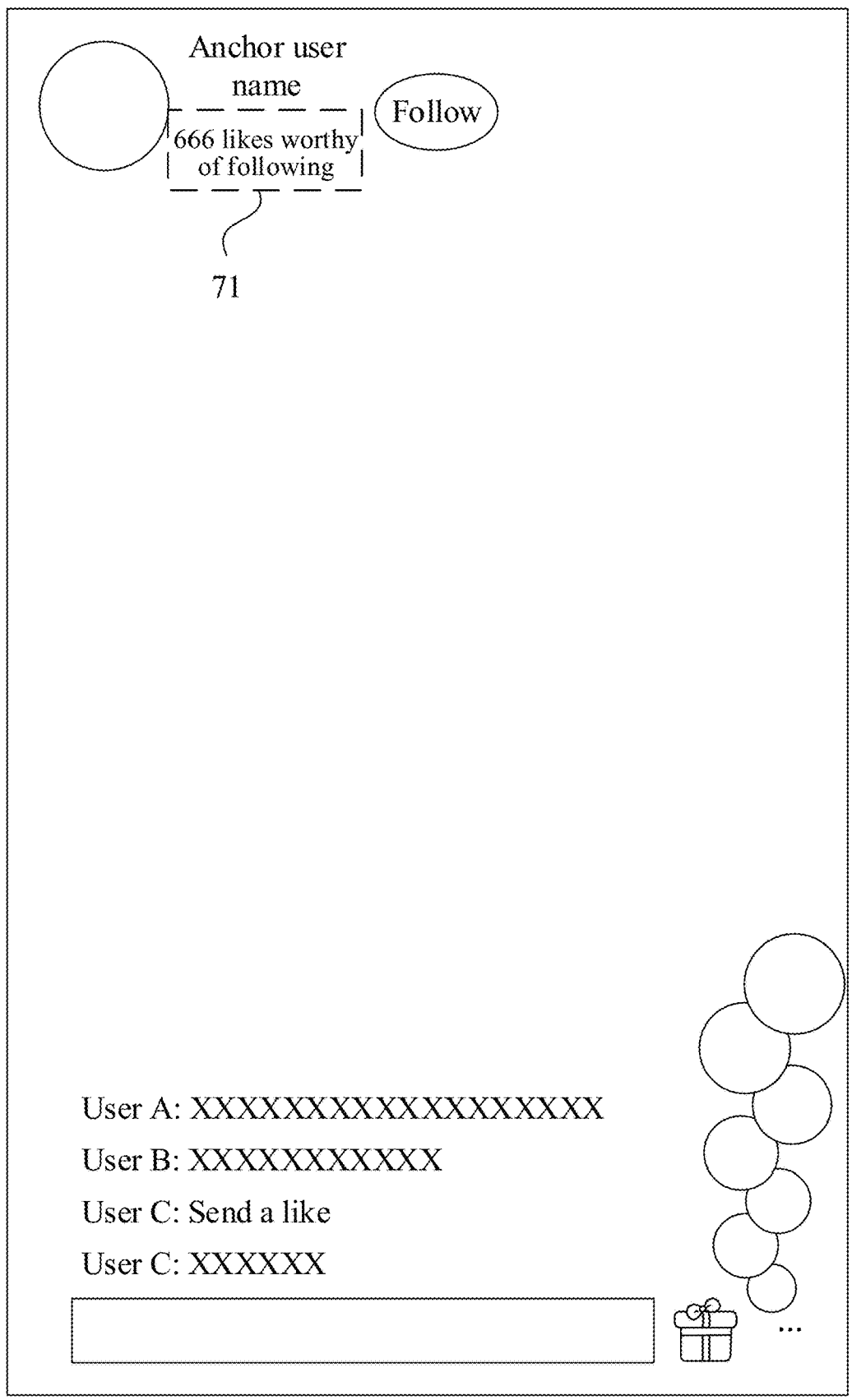
FIG. 7 is a schematic diagram of a current livestreaming room screen when a preset state of a livestreaming room is ended provided by an embodiment of the present disclosure.

Exemplarily, a schematic diagram of a current livestreaming room screen when the preset state of the livestreaming room is ended is shown in FIG. 7. In FIG. 7, the third preset position is a position below the anchor user name, "666 likes worthy of following" 71 is the prompt information including the total number of likes given by users during the period when the livestreaming room is in the preset state, and "666 likes" is the total number of likes given by users during the period when the livestreaming room is in the preset state.

Operation two: displaying prompt information including a user identification of a current user and the number of objects giving likes to the anchor at a fourth preset position of the current livestreaming room screen.

The fourth preset position may be any preset position in the current livestreaming room screen, for example, directly in a middle of the livestreaming room screen, directly above the livestreaming room screen, etc. The current user may be a user who logs into the audience terminal, and the user identification may be a nickname, an avatar, etc. The number of objects giving likes to the anchor may be the number of users who give likes to the anchor. The prompt information of the number of objects giving likes to the anchor may be text information, animation information, etc. for prompting the number of objects giving likes to the anchor.

Exemplarily, when the preset state of the livestreaming room is ended, the user identification of the current user and the number of objects giving likes to the anchor are determined, and the prompt information is generated according to the user identification of the current user and the number of objects giving likes to the anchor. Furthermore, the fourth preset position of the current livestreaming room screen is determined, and the prompt information is displayed at the fourth preset position.

Operation three: if the current user performs a like operation, the avatar and/or the number of likes of the current user are highlighted at the drifting like animation corresponding to the preset state.

The number of likes is the total number of likes given by the current user during the period when the livestreaming room is in the preset state.

Exemplarily, if the current user performs the like operation, the current user may be displayed in the drifting like animation corresponding to the preset state, so as to improve the interactivity between the livestreaming room and the current user. The avatar and/or the number of likes of the current user may be highlighted in the drifting like animation.

Figure 8:
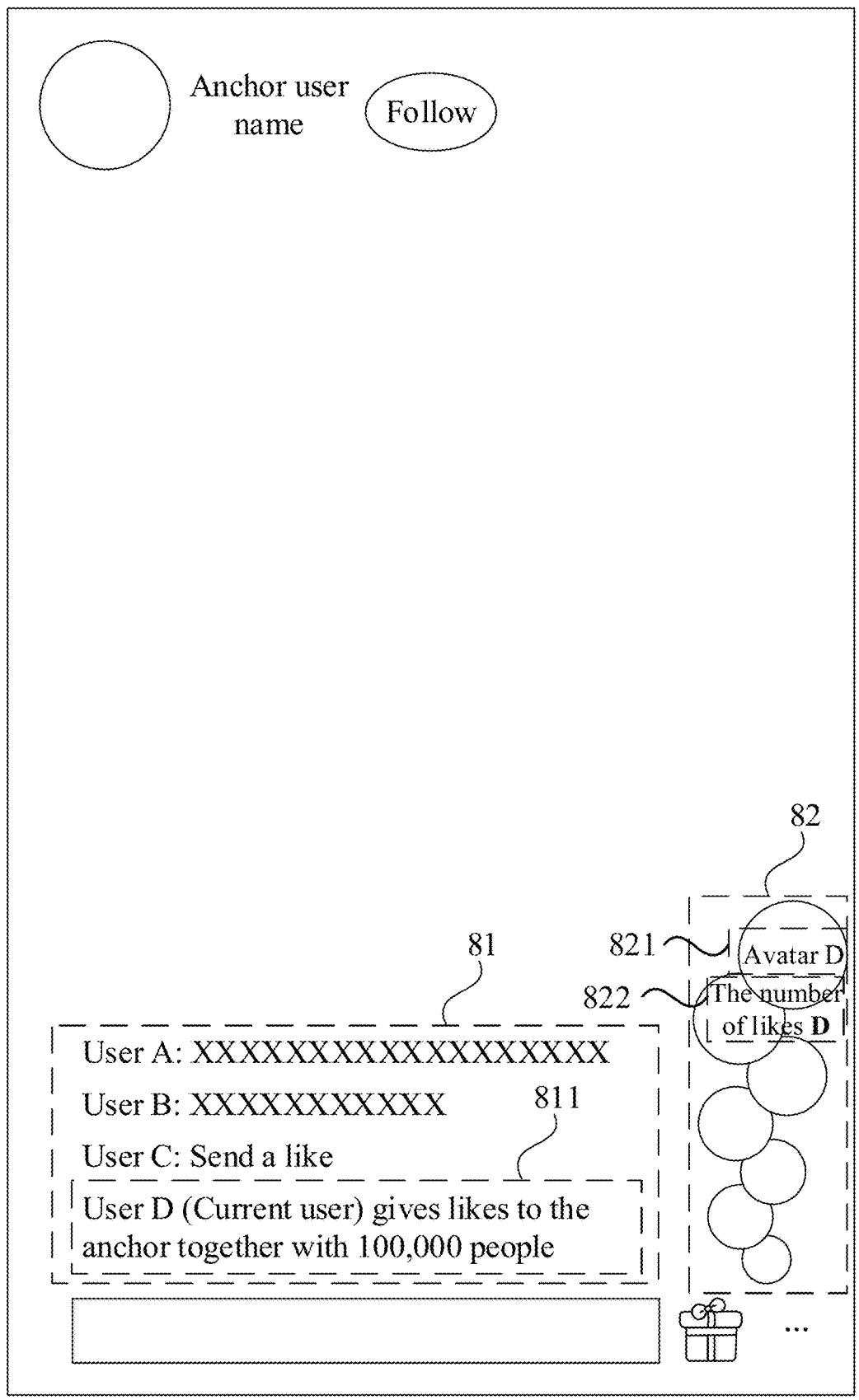
FIG. 8 is another schematic diagram of a current livestreaming room screen when the preset state of the livestreaming room is ended provided by an embodiment of the present disclosure.

Exemplarily, a schematic diagram of a current livestreaming room screen when the preset state of the livestreaming room is ended is shown in FIG. 8. In FIG. 8, the fourth preset position is within a comment region 81, and a "user D" in the comment region is the user identification of the current user, and "the user D (current user) gives likes to the anchor together with 100,000 people" 811 is the prompt information including the user identification of the current user and the number of objects giving likes to the anchor. In the drifting like animation 82 at the lower right corner of the current livestreaming room screen, the avatar D (821 in the figure) and the number of likes D (822 in the figure) of the current user D are displayed.

Optionally, the second preset position and the third preset position include surrounding positions of the follow control displayed on the current livestreaming room screen. The follow control is used for following the anchor.

On the basis of the above embodiments, in order to increase the interactivity of the like effect, the following operations can be performed: determining whether a preset vibration switch is turned on in response to the trigger operation for the current livestreaming room; and controlling a current terminal device to vibrate in response to the preset vibration switch being turned on.

For example, in some examples, the preset vibration switch is a preset like vibration switch, the trigger operation is a like trigger operation. The like vibration switch may be a vibration switch on the terminal device. The current terminal device may be a terminal device that displays the current livestreaming room screen, such as a mobile phone, a tablet computer, etc.

Exemplarily, if the current user triggers a like control on the current livestreaming room screen or other ways for liking, whether the preset vibration switch is turned on is detected, and in response to the preset vibration switch being turned on, it indicates that the user can be reminded that the user has given a like to the current livestreaming room by means of vibration.

In the present application, after a livestreaming room enters a preset state, in response to receiving a like trigger operation for the livestreaming room, target like information corresponding to the preset state is determined according to the like trigger operation; based on the target like information, a like effect corresponding to the preset state is generated, and is displayed at a first preset position of a current livestreaming room screen; a drifting like animation corresponding to the preset state is generated after the livestreaming room enters the preset state, and the drifting like animation corresponding to the preset state is displayed on the current livestreaming room screen; after the livestreaming room enters the preset state, prompt information indicating that the livestreaming room is in the preset state is displayed at the second preset position of the current livestreaming room screen. Thus, the problems of poor interactivity when users like and low user experience in the related arts are solved, and the technical effects of improving the flexibility of a video playing interface in responding to the like effect, enriching display information, improving the user participation degree, and improving the user experience are implemented.

Figure 9:
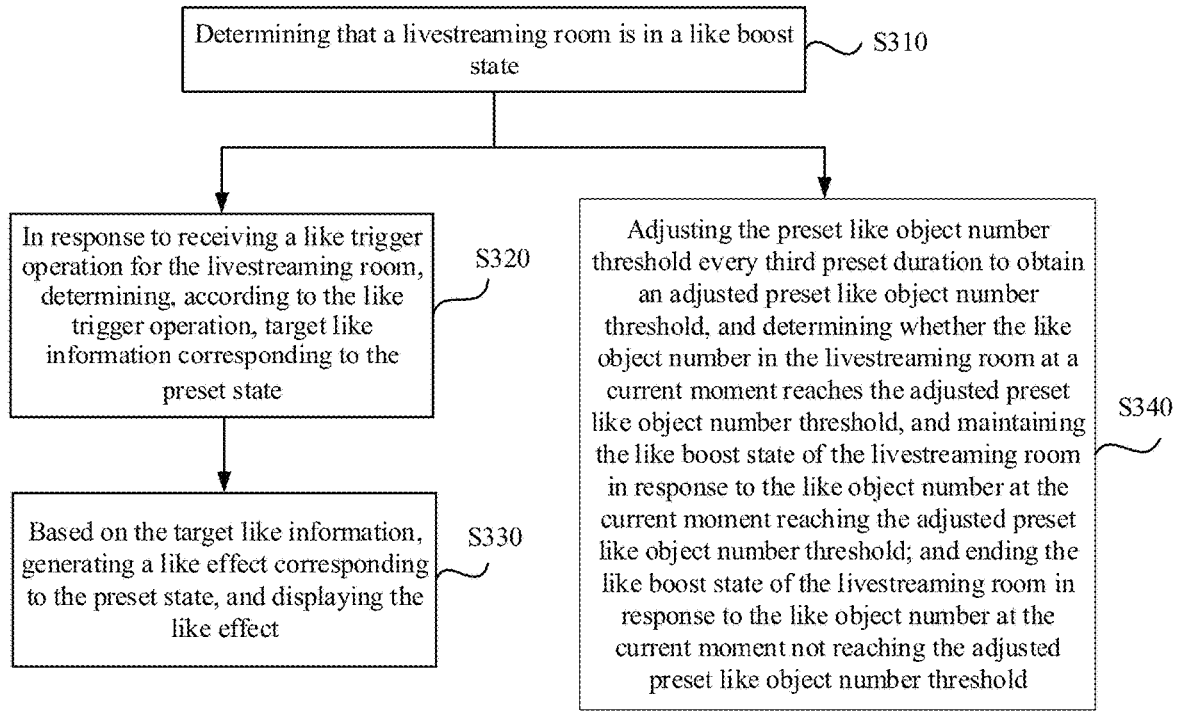
FIG. 9 is a schematic flowchart of an interface display method provided by an embodiment of the present disclosure.

FIG. 9 is a schematic flowchart of an interface display method provided by an embodiment of the present disclosure. On the basis of the aforementioned embodiments, for the specific implementation of continuous detection when the preset state is the like boost state, reference may be made to the detailed description of the present technical solution. Technical terms that are the same as or corresponding to those in the above embodiments are omitted here.

As shown in FIG. 9, the method includes:

S310: determining that a livestreaming room is in a like boost state.

S320: in response to receiving a like trigger operation for the livestreaming room, determining, according to the like trigger operation, target like information corresponding to the preset state.

Exemplarily, after the livestreaming room enters the like boost state, trigger operations for giving likes for the livestreaming room screen are received from the audience terminal, the trigger operations corresponding to the audience terminal are counted, data processing is performed on statistical results, and the data-processed like information is taken as the target like information.

On the basis of the above embodiments, the preset state is the like boost state, when the like object number (number of people) at a same moment in the livestreaming room reaches a preset like object number threshold, the livestreaming room enters the like boost state. The preset like object number threshold may be a numerical value for judging whether the livestreaming room enters the like boost state or not, and may be a numerical value preset according to an actual demand.

Exemplarily, the like boost state may include a like-double state, in this case, when an audience give one like in the like-double state, the livestreaming room may get two likes.

Exemplarily, when the like object number in the livestreaming room at the same moment reaches the preset like object number threshold, the livestreaming room is controlled to enter the like boost state.

S330: based on the target like information, generating a like effect corresponding to the preset state, and displaying the like effect. For example, the like effect can be displayed at a first preset position of a current livestreaming room screen.

S340: adjusting the preset like object number threshold every third preset duration to obtain an adjusted preset like object number threshold, and determining whether the like object number in the livestreaming room at a current moment reaches the adjusted preset like object number threshold, and maintaining the like boost state of the livestreaming room in response to the like object number at the current moment reaching the adjusted preset like object number threshold; and ending the like boost state of the livestreaming room in response to the like object number at the current moment not reaching the adjusted preset like object number threshold.

The third preset duration may be a preset duration for detecting the like boost state, and a duration value of the third preset duration may be set according to requirements.

Exemplarily, after the livestreaming room enters the like boost state, the preset like object number threshold is re-determined every third preset duration. And, according to a new preset like object number threshold, whether the like object number in the livestreaming room at the current moment reaches the new preset like object number threshold is judged. When the like object number at the current moment reaches the adjusted preset like object number threshold, it means that the like popularity in the livestreaming room is still high, and the like boost state of the livestreaming room may be maintained; when the like object number at the current moment does not reach the adjusted preset like object number threshold, it means that the like popularity in the livestreaming room has decreased, and the like boost state of the livestreaming room may be ended.

Optionally, the preset like object number threshold may be increased when the preset like object number threshold is adjusted. Therefore, the preset like object number threshold is gradually raised, so as to raise a threshold value for the like boost state and enrich like interaction.

Optionally, an initial value of the preset like object number threshold is determined according to the number of online objects in the livestreaming room. The numbers of online objects in different livestreaming rooms are different, and the preset like object number threshold that triggers the like boost state should also be adjusted adaptively, so as to make the preset like object number threshold closer to the current watching state of the livestreaming room.

Figure 10:
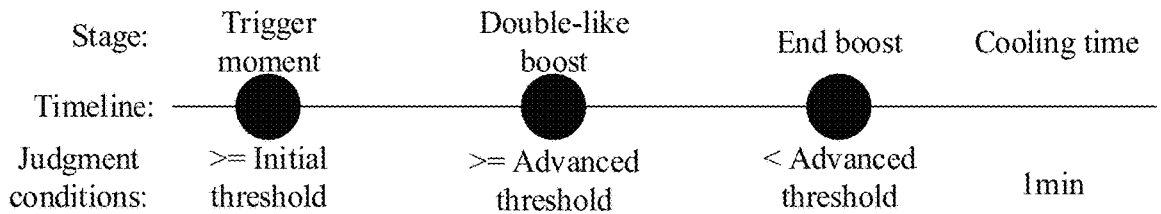
FIG. 10 is a logic schematic diagram of a livestreaming room entering a double-like boost state provided by an embodiment of the present disclosure.

Exemplarily, a logic schematic diagram of the livestreaming room entering a double-like boost state is shown in FIG. 10. In the livestreaming room, after the like object number at the same moment reaches an initial threshold (the preset like object number threshold), it triggers to enter a double-like boost stage (like boost state), and the like given by each user may get a double boost effect. A threshold (increasing the preset like object number threshold) is raised every third preset duration (for example, every 10 s, etc.), until the current threshold cannot be reached (the like object number in the livestreaming room at the current moment cannot reach the preset like object number threshold), and the boosting is ended.

a. initial threshold rule: the number of online objects in the current livestreaming room divided by 100 (rounded down (that is, Floor)) is taken as an initial threshold, and if the like object number at the same moment is greater than or equal to the initial threshold and is not less than 5, it will enter the double-like boost stage (like boost state).

b. advanced threshold rule: every third preset duration (such as, 10 s), an advanced threshold is increased by 20% (rounded down (that is, Floor)) compared with a last time point for calculation. If the like object number at the same moment is greater than or equal to the advanced threshold, it will remain in the double-like boost stage (like boost state); otherwise, it will exit the double-like boost stage.

c. boost frequency control rule: one double-like boost stage lasts at least the preset boost time (such as 10 s), and in a single livestreaming room, an interval between two double-like boost stages is at least a preset interval (such as, 1 min).

In the present application, after a livestreaming room enters a preset state, in response to receiving a like trigger operation for the livestreaming room, target like information corresponding to the preset state is determined according to the like trigger operation; based on the target like information, a like effect corresponding to the preset state is generated, and is displayed at a first preset position of a current livestreaming room screen, and a preset like object number threshold is adjusted every third preset duration after the livestreaming room enters the like boost state, and whether the like object number in the livestreaming room at the current moment reaches the adjusted preset like object number threshold is determined, if yes, the like boost state of the livestreaming room is maintained; otherwise, the like boost state of the livestreaming room is ended. Thus, the problem of low user experience caused by the statistics, in which one single like is only counted once when the user frequently likes, when the user likes in the related arts is solved, and the technical effect of improving the flexibility of the statistics of the number of likes through the like boost state to improve the user experience is implemented.

Figure 11A:
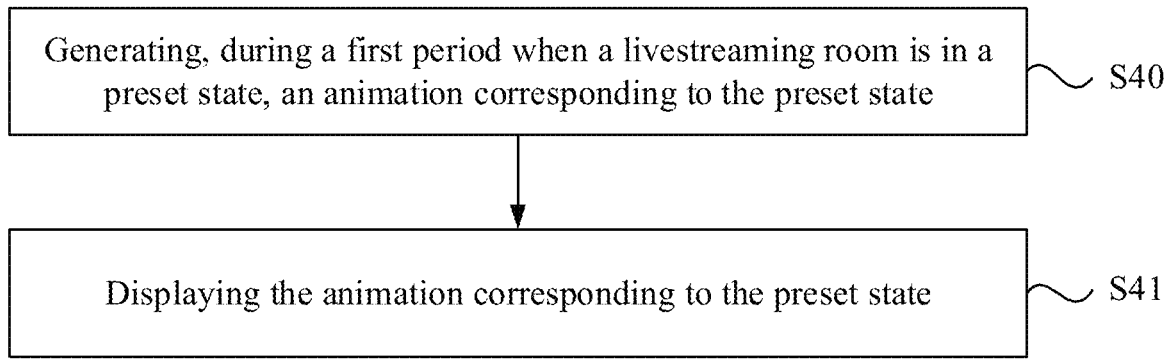
FIG. 11A is a schematic flowchart of an interface display method provided by an embodiment of the present disclosure.
Figure 11B:
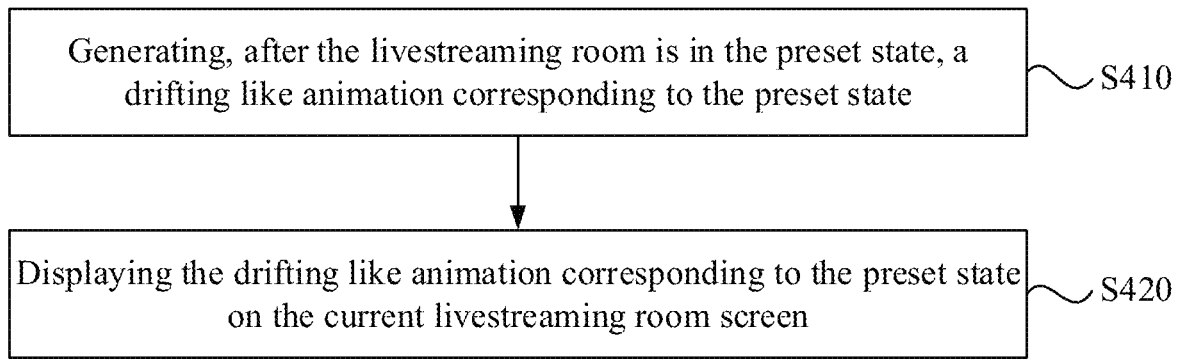
FIG. 11B is a schematic flowchart of an interface display method provided by another embodiment of the present disclosure.

FIG. 11A is a schematic flowchart of an interface display method provided by an embodiment of the present disclosure, FIG. 11B is a schematic flowchart of an interface display method provided by another embodiment of the present disclosure. The embodiment of the present disclosure is applied to a first client or a second client, for example, the first client is an audience terminal, the second client is an anchor terminal, and the embodiment of the present disclosure is used to display an outstanding effect on an interface of a livestreaming room when group liking occurs in the livestreaming room during the livestreaming process. This method may be executed by an interface display apparatus, and this apparatus may be implemented in a form of software and/or hardware, or alternatively, by an electronic device, and the electronic device may be a mobile terminal, a PC terminal, or a server, etc. Technical terms that are the same as or corresponding to those in the above embodiments are omitted here.

As shown in FIG. 11A, in an embodiment, the method includes:

S40: generating, during a first period when a livestreaming room is in a preset state, an animation corresponding to the preset state.

S41: displaying the animation corresponding to the preset state.

For example, the animation may be a drifting like animation, In the following, taking the case that the animation is a drifting like animation as an example for description.

As shown in FIG. 11B, in another embodiment, the method includes:

S410: generating, after the livestreaming room is in the preset state, a drifting like animation corresponding to the preset state.

The drifting like animation is an effect animation for representing a like popularity of the livestreaming room, and the drifting like animation when the livestreaming room is in the preset state is different from a drifting like animation displayed during a second period when the livestreaming room is not in the preset state.

Exemplarily, after the livestreaming room enters the preset state, the corresponding drifting like animation is generated according to the current preset state, so as to be displayed later.

S420: displaying the drifting like animation corresponding to the preset state on the current livestreaming room screen.

Exemplarily, the drifting like animation corresponding to the preset state is displayed on the current livestreaming room screen, so that the audience can see the drifting like animation in the preset state.

On the basis of this embodiment, optionally, the drifting like animation in the preset state may be expanded and displayed, for example, by determining association information of a target object corresponding to the livestreaming room; and displaying the association information of the target object in the displayed drifting like animation corresponding to the preset state.

The target object is at least one object whose number of likes reaches a preset like number threshold or whose number of likes is the highest, and the association information includes an identification of the target object and/or the number of likes of the target object.

Exemplarily, the target object is determined from the audiences who give likes in the livestreaming room. Furthermore, the association information of the target object is determined, and the association information of the target object is displayed in the drifting like animation corresponding to the preset state, so as to encourage the audience to like at the audience terminal and remind the anchor of information about the user, who gives likes, at the anchor terminal.

On the basis of this embodiment, it is also possible to respond to an operation behavior of the anchor and/or the audience by:

in response to receiving a trigger operation for the association information, determining attribute information of the target object corresponding to the association information and/or a follow control for following the target object corresponding to the association information; and displaying the attribute information and/or the follow control in the current livestreaming room screen.

The association information may be information related to the target object. The attribute information may be basic information of the target object, for example, account number, age, number of followers, level, etc. The trigger operation for the association information may be an operation such as clicking on the avatar or account number of the target object. The follow control may be a control for following the target object, such as a follow button, etc.

Exemplarily, when a trigger operation for the association information is received, in response to the trigger operation, the attribute information of the target object and/or the follow control for following the target object corresponding to the association information are/is determined, and the attribute information and/or the follow control are/is displayed in the current livestreaming room screen, so that the anchor or other audiences can see the attribute information of the target object and follow the target object through the follow control.

On the basis of this embodiment, when the method is applied to the audience terminal, after a livestreaming room enters a preset state, in response to receiving a like trigger operation for the livestreaming room, target like information is determined according to the like trigger operation; and based on the target like information, a like effect is generated and displayed at a first preset position of a current livestreaming room screen.

Exemplarily, after the livestreaming room enters the preset state, trigger operations for giving likes for the livestreaming room screen are received from the audience terminal. Furthermore, the trigger operations corresponding to the audience terminal are counted, data processing is performed on statistical results, and the data-processed like information is taken as the target like information. After the target like information is determined, a corresponding like effect may be generated according to the target like information. Moreover, the first preset position for displaying the like effect on the current livestreaming room screen may be determined, so as to display the like effect at the first preset position.

On the basis of this embodiment, the target like information includes a target number of likes. The actual like information includes an actual number of likes. Moreover, the target number of likes is greater than the actual number of likes.

Exemplarily, after the livestreaming room enters the preset state, in response to receiving a like trigger operation for the livestreaming room, the actual number of likes may be determined, and the target number of likes greater than the actual number of likes may be determined.

On the basis of this embodiment, the target number of likes is N times the actual number of likes, and N is an integer greater than or equal to 2; and the like effect includes prompt information of N like figures and/or prompt information of doubling the number of likes.

The like figure may be a preset figure showing a like effect, for example, a thumb figure, etc. The prompt information may be a text used to prompt that it is now in a state of doubling the number of likes, for example, "like doubling", "×2", etc.

Exemplarily, after the livestreaming room enters the preset state, in response to receiving a like trigger operation for the livestreaming room, the actual number of likes may be determined, and is doubled to obtain the target number of likes. Furthermore, based on the target like information, prompt information for doubled like figures and/or prompt information for doubling the number of likes are/is generated to display the like effect at the first preset position.

On the basis of this embodiment, when the method is applied to the audience terminal, after the livestreaming room enters the preset state, the prompt information indicating that the livestreaming room is in the preset state is displayed at a second preset position of the current livestreaming room screen.

Exemplarily, after the livestreaming room enters the preset state, the second preset position in the current livestreaming room screen is determined, and the prompt information indicating that the livestreaming room is in the preset state is displayed at the second preset position to remind the audiences that the current livestreaming room is in the preset state.

On the basis of this embodiments, the prompt information indicating that the livestreaming room is in a preset state may be highlighted by the following steps:

Step one: displaying in a scrolling manner the prompt information indicating that the livestreaming room is in the preset state at the second preset position of the current livestreaming room screen, and ending the scrolling display of the prompt information when a display duration of the prompt information reaches a first preset duration.

Step two: determining whether the livestreaming room is still in the preset state after a second preset duration, and if yes, returning to perform an operation of displaying in the scrolling manner the prompt information indicating that the livestreaming room is in the preset state at the second preset position of the current livestreaming room screen.

On the basis of this embodiment, when the method is applied to the audience terminal, at least one of the following operations may be performed when the preset state of the livestreaming room is ended:

Operation one: displaying prompt information including the total number of likes given by users during the period when the livestreaming room is in the preset state at a third preset position of the current livestreaming room screen.

Operation two: displaying prompt information including a user identification of a current user and the number of objects giving likes to the anchor at a fourth preset position of the current livestreaming room screen.

Operation three: if the current user performs a like operation, the avatar and/or the number of likes of the current user are highlighted at the drifting like animation corresponding to the preset state.

On the basis of this embodiment, when the method is applied to the anchor terminal, at least one piece of prompt information including user identifications of users who have given the likes and the number of objects giving likes to the anchor is displayed at a fifth preset position of the current livestreaming room screen.

The fifth preset position may be any preset position in the current livestreaming room screen of the anchor terminal, for example, directly in a middle of the livestreaming room screen, directly above the livestreaming room screen, etc. The user who has given the like may be one or more users who give likes for the current livestreaming room. The prompt information including the user identifications of the users who have given the likes and the number of objects giving likes to the anchor may be text information, animation information, etc., for prompting the anchor about the users who have given the likes and the total number of objects giving likes to the anchor.

Exemplarily, the user identifications of the users who have given the likes and the number of objects giving likes to the anchor are determined, and the prompt information is generated according to the user identifications of the users who have given the likes and the number of objects giving likes to the anchor. Furthermore, the fifth preset position in the current livestreaming room screen of the anchor terminal is determined, and the prompt information is displayed at the fifth preset position.

Optionally, the second preset position and the third preset position include surrounding positions of the follow control displayed on the current livestreaming room screen. The follow control is used for following the anchor.

On the basis of this embodiment, when the method is applied to the anchor terminal and/or the audience terminal, after the livestreaming room enters the like boost state, the drifting like animation corresponding to the like boost state is generated.

When the like object number in the livestreaming room at the same moment reaches the preset like object number threshold, the livestreaming room enters the like boost state. The preset like object number threshold may be a numerical value for judging whether the livestreaming room enters the like boost state or not, and may be a numerical value preset according to an actual demand.

Exemplarily, when the like object number in the livestreaming room at the same moment reaches the preset like object number threshold, the livestreaming room is controlled to enter the like boost state, and the drifting like animation corresponding to the like boost state is generated and displayed.

On the basis of this embodiment, after the livestreaming room enters the like boost state, the preset like object number threshold is adjusted every third preset duration, and whether the like object number in the livestreaming room at the current moment reaches the adjusted preset like object number threshold is determined, if yes, the like boost state of the livestreaming room is maintained; otherwise, the like boost state of the livestreaming room is ended.

According to the present application, after the livestreaming room enters the preset state, the drifting like animation corresponding to the preset state is generated, and the drifting like animation corresponding to the preset state is displayed on the current livestreaming room screen, so that the problem of low user experience caused by single interactivity when users like in the related arts is solved, and the technical effect of improving the flexibility of the video playing interface in responding to the like effect and the diversity of the display effect to improve the user experience is achieved.

Figure 12:
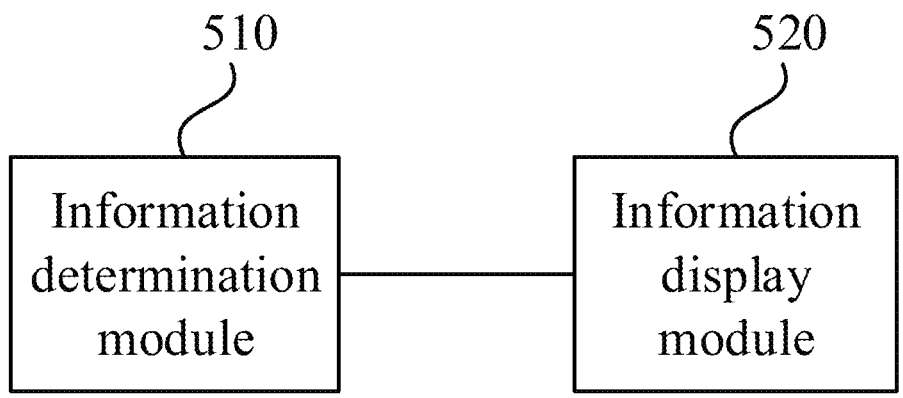
FIG. 12 is a structural schematic diagram of an interface display apparatus provided by an embodiment of the present disclosure.

FIG. 12 is a structural schematic diagram of an interface display apparatus provided by an embodiment of the present disclosure. As shown in FIG. 12, the apparatus is configured at an audience terminal and includes: an information determination module 510 and an information display module 520.

In an embodiment, the information determination module 510 is configured to: during a first period when a livestreaming room is in a preset state, in response to receiving an interaction trigger operation for the livestreaming room, determine, according to the interaction trigger operation, target interaction information corresponding to the preset state. The target interaction information is different from actual interaction information corresponding to the interaction trigger operation; and the information display module 520 is configured to: based on the target interaction information, generate an interaction effect corresponding to the preset state, and display the interaction effect.

In another embodiment, the information determination module 510 is configured to: after a livestreaming room enters a preset state, in response to receiving a like trigger operation for the livestreaming room, determine, according to the like trigger operation, target like information corresponding to the preset state, the target like information being different from actual like information corresponding to the like trigger operation; and the information display module 520 is configured to: based on the target like information, generate a like effect corresponding to the preset state, and display the like effect at a first preset position of a current livestreaming room screen.

On the basis of the above technical solution, the target like information includes a target number of likes and the actual like information includes an actual number of likes; and the target number of likes is greater than the actual number of likes.

On the basis of the above technical solution, the target number of likes is N times the actual number of likes, and N is an integer greater than or equal to 2; and the like effect includes prompt information of N like figures and/or prompt information of doubling the number of likes.

On the basis of the above technical solution, the apparatus further includes: a drifting like animation display module configured to: generate, after the livestreaming room enters the preset state, a drifting like animation corresponding to the preset state, where the drifting like animation is an effect animation for representing a like popularity of the livestreaming room, and the drifting like animation is different from a drifting like animation displayed when the livestreaming room is not in the preset state; and display the drifting like animation corresponding to the preset state on the current livestreaming room screen.

On the basis of the above technical solution, the apparatus further includes: a first association information display module configured to determine association information of a target object corresponding to the livestreaming room and display the association information of the target object in the displayed drifting like animation corresponding to the preset state. The target object is at least one object whose number of likes reaches a preset like number threshold or whose number of likes is the highest, and the association information includes an identification of the target object and/or the number of likes of the target object.

On the basis of the above technical solution, the apparatus further includes: a prompt information display module configured to display, after the livestreaming room enters the preset state, prompt information indicating that the livestreaming room is in the preset state at a second preset position of the current livestreaming room screen.

On the basis of the above technical solution, the prompt information display module is further configured to: display in a scrolling manner the prompt information indicating that the livestreaming room is in the preset state at the second preset position of the current livestreaming room screen, and end the scrolling display of the prompt information when a display duration of the prompt information reaches a first preset duration; and determine whether the livestreaming room is still in the preset state after a second preset duration, and if yes, return to perform an operation of displaying in the scrolling manner the prompt information indicating that the livestreaming room is in the preset state at the second preset position of the current livestreaming room screen.

On the basis of the above technical solution, the preset state is a like boost state, when the like object number in the livestreaming room at the same moment reaches a preset like object number threshold, the livestreaming room enters the like boost state.

On the basis of the above technical solution, the apparatus further includes: a threshold adjustment module configured to: adjust, after the livestreaming room enters the like boost state, the preset like object number threshold every third preset duration to obtain an adjusted preset like object number threshold, and determine whether the like object number in the livestreaming room at a current moment reaches the adjusted preset like object number threshold, and if yes, maintain the like boost state of the livestreaming room; otherwise, end the like boost state of the livestreaming room.

On the basis of the above technical solution, the threshold adjustment module is further configured to increase the preset like object number threshold.

On the basis of the above technical solution, an initial value of the preset like object number threshold is determined according to the number of online objects in the livestreaming room.

On the basis of the above technical solution, the apparatus further includes: a vibration trigger module configured to determine whether a preset like vibration switch is turned on in response to a like trigger operation for a current livestreaming room, and if yes, control a current terminal device to vibrate.

In the present application, after a livestreaming room enters a preset state, in response to receiving a like trigger operation for the livestreaming room, target like information corresponding to the preset state is determined according to the like trigger operation; based on the target like information, a like effect corresponding to the preset state is generated, and is displayed at a first preset position of a current livestreaming room screen. Thus, the problems of single interactivity when users like and low user experience in the related arts are solved, and the technical effects of improving the flexibility of a video playing interface in responding to the like effect, and improving the user experience are achieved.

The interface display apparatus provided by the embodiments of the present disclosure can execute the interface display method provided by any embodiment of the present disclosure, and has corresponding functional modules to execute the method.

It is worth noting that the various units and modules included in the above-described apparatus are only divided according to functional logics, but not limited to the division manner described above, as long as the corresponding functions can be implemented; in addition, the specific names of the functional units are only for the convenience of distinguishing between each other, and are not intended to limit the protection scope of the embodiments of the present disclosure.

Figure 13:
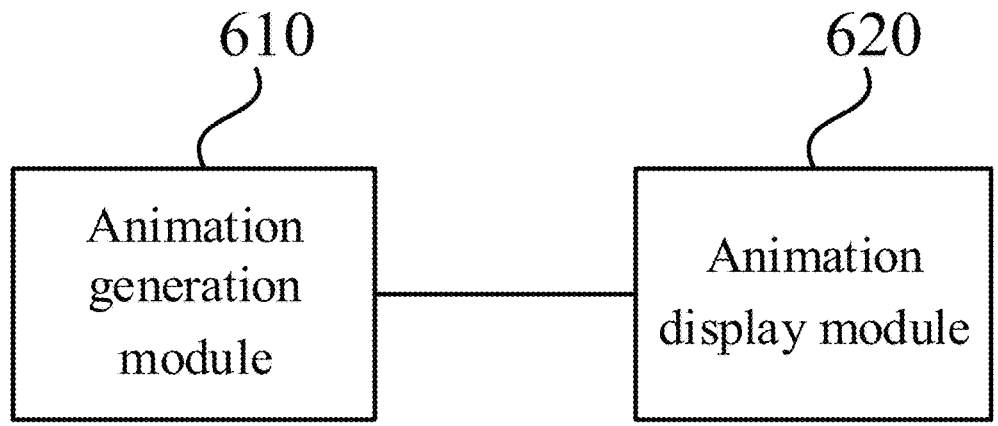
FIG. 13 is a structural schematic diagram of an interface display apparatus provided by an embodiment of the present disclosure.

FIG. 13 is a structural schematic diagram of an interface display apparatus provided by an embodiment of the present disclosure. As shown in FIG. 13, the apparatus is configured at an audience terminal or an anchor terminal, and includes: an animation generation module 610 and an animation display module 620.

In an embodiment, the animation generation module 610 is configured to generate, during a first period when a livestreaming room is in a preset state, an animation corresponding to the preset state, the animation is an effect animation for representing a like popularity of the livestreaming room, and the animation is different from an animation displayed during a second period when the livestreaming room is not in the preset state; and the animation display module 620 is configured to display the animation corresponding to the preset state.

In another embodiment, the animation generation module 610 is configured to generate, after a livestreaming room enters a preset state, a drifting like animation corresponding to the preset state, the drifting like animation is an effect animation for representing a like popularity of the livestreaming room, and the drifting like animation is different from a drifting like animation displayed when the livestreaming room is not in the preset state; and the animation display module 620 is configured to display the drifting like animation corresponding to the preset state on a current livestreaming room screen.

On the basis of the above technical solution, the apparatus further includes: a second association information display module configured to determine association information of a target object corresponding to the livestreaming room and display the association information of the target object in the displayed drifting like animation corresponding to the preset state, the target object is at least one object whose number of likes reaches a preset like number threshold or whose number of likes is the highest, and the association information includes an identification of the target object and/or the number of likes of the target object.

On the basis of the above technical solution, the apparatus further includes: a third association information display module configured to: in response to receiving a trigger operation for the association information, determine attribute information of the target object corresponding to the association information and/or a follow control for following the target object corresponding to the association information; and display the attribute information and/or the follow control in the current livestreaming room screen.

According to the present application, after the livestreaming room enters the preset state, the drifting like animation corresponding to the preset state is generated, and the drifting like animation corresponding to the preset state is displayed on the current livestreaming room screen, so that the problem of low user experience caused by single interactivity when users like in the related arts is solved, and the technical effect of improving the flexibility of the video playing interface in responding to the like effect and the diversity of the display effect to improve the user experience is achieved.

The interface display apparatus provided by the embodiments of the present disclosure can execute the interface display method provided by any embodiment of the present disclosure, and has corresponding functional modules to execute the method.

It is worth noting that the various units and modules included in the above-described apparatus are only divided according to functional logics, but not limited to the division manner described above, as long as the corresponding functions can be implemented; in addition, the specific names of the functional units are only for the convenience of distinguishing between each other, and are not intended to limit the protection scope of the embodiments of the present disclosure.

Figure 14:
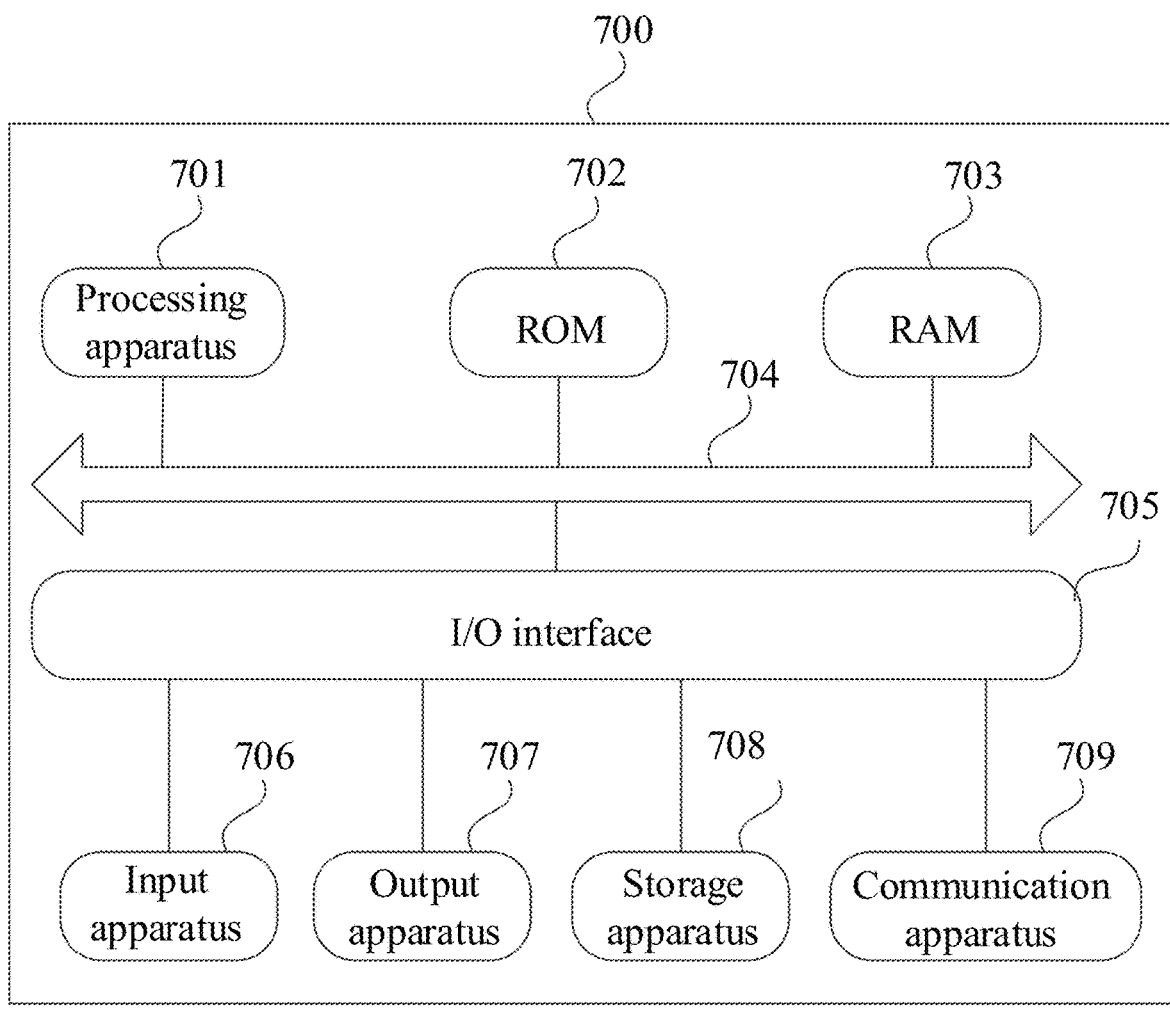
FIG. 14 is a structural schematic diagram of a computer device provided by an embodiment of the present disclosure.

FIG. 14 is a structural schematic diagram of a computer device provided by an embodiment of the present disclosure. Reference is made below to FIG. 14, which shows a structural schematic diagram of a computer device (for example, a terminal device or a server in FIG. 14) 700 suitable for implementing an embodiment of the present disclosure. The computer device in the embodiments of the present disclosure can include, but is not limited to, mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital television (TV), a desktop computer, or the like. The computer device shown in FIG. 14 is only an example, and should not bring any limitation to the functions and application scope of the embodiments of the present disclosure.

As shown in FIG. 14, the computer device 700 may include a processing apparatus (for example, a central processing unit, a graphics processing unit, etc.) 701, which may perform various appropriate actions and processes according to programs stored in a read-only memory (ROM) 702 or programs loaded from a storage apparatus 708 into a random access memory (RAM) 703. In the RAM 703, various programs and data required for operations of the computer device 700 are also stored. The processing apparatus 701, the ROM 702, and the RAM 703 are connected to each other through a bus 704. An input/output (I/O) interface 705 is also connected to the bus 704.

Usually, the following apparatuses can be connected to the I/O interface 705: an input apparatus 706 including, for example, a touch screen, a touch pad, a keyboard, a mouse, a camera, a microphone, an accelerometer, a gyroscope, or the like; an output apparatus 707 including, for example, a liquid crystal display (LCD), a loudspeaker, a vibrator, or the like; a storage apparatus 708 including, for example, a magnetic tape, a hard disk, or the like; and a communication apparatus 709. The communication apparatus 709 may allow the computer device 700 to be in wireless or wired communication with other devices to exchange data. While FIG. 14 illustrates the computer device 700 having various apparatuses, it should be understood that not all of the illustrated apparatuses are required to be implemented or included. More or fewer apparatuses may be implemented or provided alternatively.

In particular, according to the embodiments of the present disclosure, processes described above with reference to the flowchart may be implemented as a computer software program. For example, an embodiment of the present disclosure includes a computer program product, which includes a computer program carried on a non-transitory computer-readable medium, and the computer program includes program codes for performing the method shown in the flowchart. In such an embodiment, the computer program may be downloaded and installed from a network through the communication apparatus 709, or installed from the storage apparatus 708, or installed from the ROM 702. When the computer program is executed by the processing apparatus 701, the above functions defined in the method of the embodiment of the present disclosure are performed.

The names of messages or information exchanged between a plurality of apparatuses in the implementations of the present disclosure are used for illustrative purposes only, and are not intended to limit the scope of the messages or information. The computer device provided by the embodiment of the present disclosure belongs to the same inventive concept as the interface display method provided by the above embodiment, and the technical details not described in detail in this embodiment may refer to the above embodiment.

An embodiment of the present disclosure provides a non-transitory computer-readable storage medium, a computer program is stored on the non-transitory computer-readable storage medium, when the computer program is executed by a processor, the interface display method provided by the above embodiments is implemented.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semi-conductive system, apparatus, or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disc read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus, or device. In the present disclosure, the computer-readable signal medium may include a data signal that propagates in a baseband or as a part of a carrier wave and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate, or transmit a program used by or in combination with an instruction execution system, apparatus, or device. The program code contained on the computer-readable medium may be transmitted by using any suitable medium, including but not limited to an electric wire, a fiber-optic cable, radio frequency (RF), and the like, or any appropriate combination of them.

In some implementations, a client and a server may communicate by using any currently known or future developed network protocol, such as HTTP (HyperText Transfer Protocol), and may be interconnected with digital data communication (for example, the communications network) in any form or medium. Examples of the communication network include a local area network ("LAN"), a wide area network ("WAN"), the Internet (for example, the Internet), and an end-to-end network (for example, an ad hoc end-to-end network), as well as any currently known or future developed network.

The above-mentioned computer-readable medium may be included in the computer device described above, or may exist alone without being assembled into the computer device.

The above-mentioned computer-readable medium carries at least one program, when the at least one program is executed by the computer device, the computer device is caused to perform the following steps:

after a livestreaming room enters a preset state, in response to receiving a like trigger operation for the livestreaming room, determining, according to the like trigger operation, target like information corresponding to the preset state, the target like information being different from actual like information corresponding to the like trigger operation; and based on the target like information, generating a like effect corresponding to the preset state, and displaying the like effect at a first preset position of a current livestreaming room screen;

alternatively, generating, after the livestreaming room enters the preset state, a drifting like animation corresponding to the preset state, where the drifting like animation is an effect animation for representing a like popularity of the livestreaming room, and the drifting like animation is different from a drifting like animation displayed when the livestreaming room is not in the preset state; and displaying the drifting like animation corresponding to the preset state on a current livestreaming room screen.

An embodiment of the present application also provides a computer program product, including a computer program, and the computer program, when executed by a processor, implements the interface display method provided by any embodiment of the present application.

During the implementation of the computer program product, the computer program codes for performing the operations of the present disclosure can be written in one or more programming languages or a combination thereof. The programming languages include object-oriented programming languages such as Java, Smalltalk, C++, and also include conventional procedural programming languages such as the "C" language or similar programming languages. The program code can be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate system architectures, functions, and operations that may be implemented by the system, the method, and the computer program product according to the various embodiments of the present disclosure. In this regard, each block in the flowcharts or block diagrams may represent a module, a program segment, or a part of codes, and the module, the program segment, or the part of codes includes one or more executable instructions for implementing specified logic functions. It should also be noted that, in some alternative implementations, functions marked in the blocks may also occur in an order different from the order designated in the accompanying drawings. For example, two consecutive blocks can actually be executed substantially in parallel, and they may sometimes be executed in a reverse order, which depends on involved functions. It should also be noted that each block in the block diagrams and/or flowcharts and combinations of the blocks in the block diagrams and/or flowcharts may be implemented by a dedicated hardware-based system for executing specified functions or operations, or may be implemented by a combination of a dedicated hardware and computer instructions.

The units described and involved in the embodiments of the present disclosure may be implemented by software, or may be implemented by hardware. In some cases, the name of a unit does not constitute a limitation on the unit itself.

The functions described above in the present disclosure may be executed at least in part by one or more hardware logic components. For example, without limitations, exemplary types of the hardware logic components that can be used include: a field programmable gate array (FPGA), an application specific integrated circuit (ASIC), an application specific standard product (ASSP), a system on chip (SOC), a complex programmable logic device (CPLD), and the like.

In the context of the present disclosure, a machine readable medium may be a tangible medium that may include or store a program for use by or in combination with an instruction execution system, apparatus, or device. The machine readable medium may be a machine readable signal medium or a machine readable storage medium. The machine readable medium may include but not be limited to an electronic, magnetic, optical, electromagnetic, infrared, or semi-conductive system, apparatus, or device, or any appropriate combination of them. More specific examples of the machine readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of them.

According to at least one embodiment of the present disclosure, an interface display method is provided and is applied to an audience terminal, and the method includes:
  after a livestreaming room enters a preset state, in response to receiving a like trigger operation for the livestreaming room, determining, according to the like trigger operation, target like information corresponding to the preset state, the target like information being different from actual like information corresponding to the like trigger operation; and
  based on the target like information, generating a like effect corresponding to the preset state, and displaying the like effect at a first preset position of a current livestreaming room screen.

According to at least one embodiment of the present disclosure, an interface display method is provided, and optionally, the target like information comprises a target number of likes, the actual like information comprises an actual number of likes, and the target number of likes is greater than the actual number of likes.

According to at least one embodiment of the present disclosure, an interface display method is provided, and optionally, the target number of likes is N times the actual number of likes, and N is an integer greater than or equal to 2; and the like effect comprises prompt information for N like figures and/or prompt information for doubling a number of likes.

According to at least one embodiment of the present disclosure, an interface display method is provided and further comprises:
  optionally, generating, after the livestreaming room enters the preset state, a drifting like animation corresponding to the preset state, where the drifting like animation is an effect animation for representing a like popularity of the livestreaming room, and the drifting like animation is different from a drifting like animation displayed when the livestreaming room is not in the preset state; and
  displaying the drifting like animation corresponding to the preset state on the current livestreaming room screen.

According to at least one embodiment of the present disclosure, an interface display method is provided and further comprises:
  optionally, determining association information of a target object corresponding to the livestreaming room; and
  displaying the association information of the target object in the displayed drifting like animation corresponding to the preset state;
  the target object is at least one object whose number of likes reaches a preset like number threshold or whose number of likes is highest, and the association information comprises an identification of the target object and/or a number of likes corresponding to the target object.

According to at least one embodiment of the present disclosure, an interface display method is provided and further comprises:
  optionally, displaying, after the livestreaming room enters the preset state, prompt information indicating that the livestreaming room is in the preset state at a second preset position of the current livestreaming room screen.

According to at least one embodiment of the present disclosure, an interface display method is provided, and optionally, the displaying prompt information indicating that the livestreaming room is in the preset state at a second preset position of the current livestreaming room screen comprises:
  displaying in a scrolling manner the prompt information indicating that the livestreaming room is in the preset state at the second preset position of the current livestreaming room screen, and ending scrolling display of the prompt information when a display duration of the prompt information reaches a first preset duration; and
  determining whether the livestreaming room is still in the preset state after a second preset duration, and if yes, returning to perform an operation of displaying in the scrolling manner the prompt information indicating that the livestreaming room is in the preset state at the second preset position of the current livestreaming room screen.

According to at least one embodiment of the present disclosure, an interface display method is provided, and optionally, the preset state is a like boost state; and the livestreaming room enters the like boost state when a like object number in the livestreaming room at a same moment reaches a preset like object number threshold.

According to at least one embodiment of the present disclosure, an interface display method is provided and further comprises:
optionally, adjusting, after the livestreaming room enters the like boost state, the preset like object number threshold every third preset duration to obtain an adjusted preset like object number threshold and determining whether the like object number in the livestreaming room at a current moment reaches the adjusted preset like object number threshold, and if yes, maintaining the like boost state of the livestreaming room; and otherwise, ending the like boost state of the livestreaming room.

According to at least one embodiment of the present disclosure, an interface display method is provided and further comprises:
optionally, determining whether a preset like vibration switch is turned on in response to a like trigger operation for a current livestreaming room; and if yes, controlling a current terminal device to vibrate.

According to at least one embodiment of the present disclosure, an interface display method is provided and is applied to a first client, and the method includes:
during a first period when a livestreaming room is in a preset state, in response to receiving an interaction trigger operation for the livestreaming room, determining, according to the interaction trigger operation, target interaction information corresponding to the preset state, the target interaction information being different from actual interaction information corresponding to the interaction trigger operation; and
based on the target interaction information, generating an interaction effect corresponding to the preset state, and displaying the interaction effect.

According to at least one embodiment of the present disclosure, an interface display method is provided, and optionally, the interaction trigger operation comprises a like trigger operation, the target interaction information comprises target like information, the actual interaction information comprises actual like information, the target like information comprises a target number of likes, the actual like information comprises an actual number of likes, and the target number of likes is greater than the actual number of likes.

According to at least one embodiment of the present disclosure, an interface display method is provided, and optionally, the target number of likes is N times the actual number of likes, and N is an integer greater than or equal to 2; and the interaction effect comprises a like effect, the like effect comprises prompt information for at least one selected from a group comprising N like figures and doubling a number of likes.

According to at least one embodiment of the present disclosure, an interface display method is provided and further comprises:
generating, during the first period when the livestreaming room is in the preset state, an animation corresponding to the preset state, the animation being an effect animation for representing a like popularity of the livestreaming room, and the animation being different from an animation displayed during a second period when the livestreaming room is not in the preset state; and displaying the animation corresponding to the preset state.

According to at least one embodiment of the present disclosure, an interface display method is provided and further comprises: determining association information of a target object corresponding to the livestreaming room; and displaying the association information of the target object in the animation corresponding to the preset state; the target object is at least one object whose number of likes reaches a preset like number threshold or whose number of likes is highest, and the association information comprises at least one selected from a group comprising an identification of the target object and a number of likes corresponding to the target object.

According to at least one embodiment of the present disclosure, an interface display method is provided and further comprises: displaying, during the first period when the livestreaming room is in the preset state, prompt information indicating that the livestreaming room is in the preset state.

According to at least one embodiment of the present disclosure, an interface display method is provided, and optionally, the displaying prompt information indicating that the livestreaming room is in the preset state comprises: displaying in a scrolling manner the prompt information indicating that the livestreaming room is in the preset state, and ending scrolling display of the prompt information when a display duration of the prompt information reaches a first preset duration; and determining whether the livestreaming room is still in the preset state after a second preset duration, and in response to the livestreaming room being still in the preset state, returning to perform an operation of displaying in the scrolling manner the prompt information indicating that the livestreaming room is in the preset state.

According to at least one embodiment of the present disclosure, an interface display method is provided, and optionally, the preset state comprises a like boost state; and the livestreaming room is in the like boost state when a like object number in the livestreaming room at a same moment reaches a preset like object number threshold.

According to at least one embodiment of the present disclosure, an interface display method is provided and further comprises: adjusting, when the livestreaming room is in the like boost state, the preset like object number threshold every third preset duration to obtain an adjusted preset like object number threshold and determining whether the like object number in the livestreaming room at a current moment reaches the adjusted preset like object number threshold, and maintaining the like boost state of the livestreaming room in response to the like object number in the livestreaming room at the current moment reaching the adjusted preset like object number threshold; and ending the like boost state of the livestreaming room in response to the like object number in the livestreaming room at the current moment not reaching the adjusted preset like object number threshold.

According to at least one embodiment of the present disclosure, an interface display method is provided and further comprises: determining whether a preset like vibration switch is turned on in response to a like trigger operation for a current livestreaming room; and controlling a current terminal device to vibrate in response to the preset like vibration switch being turned on.

According to at least one embodiment of the present disclosure, an interface display method is provided and is applied to an audience terminal or an anchor terminal, and the method comprises:

generating, after a livestreaming room enters a preset state, a drifting like animation corresponding to the preset state, where the drifting like animation is an effect animation for representing a like popularity of the livestreaming room, and the drifting like animation is different from a drifting like animation displayed when the livestreaming room is not in the preset state; and displaying the drifting like animation corresponding to the preset state on a current livestreaming room screen.

According to at least one embodiment of the present disclosure, an interface display method is provided and further comprises:

optionally, determining association information of a target object corresponding to the livestreaming room; and displaying the association information of the target object in the displayed drifting like animation corresponding to the preset state;

where the target object is at least one object whose number of likes reaches a preset like number threshold or whose number of likes is highest, and the association information comprises an identification of the target object and/or a number of likes corresponding to the target object.

According to at least one embodiment of the present disclosure, an interface display method is provided and further comprises:

optionally, in response to receiving a trigger operation for the association information, determining attribute information of the target object corresponding to the association information and/or a follow control for following the target object corresponding to the association information; and displaying the attribute information and/or the follow control in the current livestreaming room screen.

According to at least one embodiment of the present disclosure, an interface display method is provided and is applied to a first client or a second client, and the method includes: generating, during a first period when a livestreaming room is in a preset state, an animation corresponding to the preset state, the animation being an effect animation for representing a like popularity of the livestreaming room, and the animation being different from an animation displayed during a second period when the livestreaming room is not in the preset state; and displaying the animation corresponding to the preset state.

According to at least one embodiment of the present disclosure, an interface display method is provided and further comprises: determining association information of a target object corresponding to the livestreaming room; and displaying the association information of the target object in the animation corresponding to the preset state; the target object is at least one object whose number of likes reaches a preset like number threshold or whose number of likes is highest, and the association information comprises at least one selected from a group comprising an identification of the target object and a number of likes corresponding to the target object.

According to at least one embodiment of the present disclosure, an interface display method is provided and further comprises: in response to receiving a trigger operation for the association information, determining at least one selected from a group comprising attribute information of the target object corresponding to the association information and a follow control for following the target object corresponding to the association information; and displaying at least one selected from the group comprising the attribute information and the follow control.

According to at least one embodiment of the present disclosure, an interface display method is provided, and optionally, the animation is a drifting like animation.

According to at least one embodiment of the present disclosure, an interface display apparatus is provided and is configured at an audience terminal, and the apparatus comprises:

an information determination module, configured to: after a livestreaming room enters a preset state, in response to receiving a like trigger operation for the livestreaming room, determine, according to the like trigger operation, target like information corresponding to the preset state, the target like information being different from actual like information corresponding to the like trigger operation; and an information display module, configured to: based on the target like information, generate a like effect corresponding to the preset state, and display the like effect at a first preset position of a current livestreaming room screen.

According to at least one embodiment of the present disclosure, an interface display apparatus is provided and is configured at an audience terminal or an anchor terminal, and the apparatus comprises:

an animation generation module, configured to generate, after a livestreaming room enters a preset state, a drifting like animation corresponding to the preset state, where the drifting like animation is an effect animation for representing a like popularity of the livestreaming room, and the drifting like animation is different from a drifting like animation displayed when the livestreaming room is not in the preset state; and an animation display module, configured to display the drifting like animation corresponding to the preset state on a current livestreaming room screen.

In addition, although operations have been described in a particular order, it shall not be construed as requiring that such operations are performed in the stated particular order or in a sequential order. Under certain circumstances, multitasking and parallel processing may be advantageous Similarly, although some specific implementation details are included in the above discussions, these shall not be construed as limitations to the scope of the present disclosure. Some features described in the context of a separate embodiment may also be implemented in combination in a single embodiment. Conversely, various features described in the context of a single embodiment may also be implemented in various embodiments individually or in a plurality of embodiments in any appropriate sub-combination.

The invention claimed is:

1. An interface display method, applied to a first client, and the method comprising:

during a first period when a livestreaming room is in a preset state, in response to receiving an interaction trigger operation for the livestreaming room, determining, according to actual interaction information corresponding to the interaction trigger operation, target interaction information corresponding to the preset state, wherein in the preset state, the target interaction information is different from the actual interaction information corresponding to the interaction trigger operation;

based on the target interaction information, generating an interaction effect corresponding to the preset state, and displaying the interaction effect;

determining association information of a target object corresponding to the livestreaming room; and displaying the association information of the target object;

wherein the target object is at least one object whose number of likes reaches a preset like number threshold or whose number of likes is highest, and the association information comprises at least one selected from a group comprising an identification of the target object and a number of likes corresponding to the target object.

2. The method according to claim 1, wherein the interaction trigger operation comprises a like trigger operation, the target interaction information comprises target like information, the actual interaction information comprises actual like information, the target like information comprises a target number of likes, the actual like information comprises an actual number of likes, and the target number of likes is greater than the actual number of likes.

3. The method according to claim 2, wherein the target number of likes is N times the actual number of likes, and N is an integer greater than or equal to 2; and the interaction effect comprises a like effect, the like effect comprises prompt information for at least one selected from a group comprising N like figures and doubling a number of likes.

4. The method according to claim 1, further comprising:

generating, during the first period when the livestreaming room is in the preset state, an animation corresponding to the preset state, wherein the animation is an effect animation for representing a like popularity of the livestreaming room, and the animation is different from an animation displayed during a second period when the livestreaming room is not in the preset state; and displaying the animation corresponding to the preset state.

5. The method according to claim 4, wherein the preset state comprises a like boost state; and the livestreaming room is in the like boost state when a like object number in the livestreaming room at a same moment reaches a preset like object number threshold.

6. The method according to claim 5, further comprising:

adjusting, when the livestreaming room is in the like boost state, the preset like object number threshold every third preset duration to obtain an adjusted preset like object number threshold and determining whether the like object number in the livestreaming room at a current moment reaches the adjusted preset like object number threshold, and maintaining the like boost state of the livestreaming room in response to the like object number in the livestreaming room at the current moment reaching the adjusted preset like object number threshold; and ending the like boost state of the livestreaming room in response to the like object number in the livestreaming room at the current moment not reaching the adjusted preset like object number threshold.

7. The method according to claim 4, further comprising:

determining whether a preset like vibration switch is turned on in response to a like trigger operation for a current livestreaming room; and controlling a current terminal device to vibrate in response to the preset like vibration switch being turned on.

8. The method according to claim 1, further comprising:

displaying, during the first period when the livestreaming room is in the preset state, prompt information indicating that the livestreaming room is in the preset state.

9. The method according to claim 8, wherein the displaying prompt information indicating that the livestreaming room is in the preset state comprises:

displaying in a scrolling manner the prompt information indicating that the livestreaming room is in the preset state, and ending scrolling display of the prompt information when a display duration of the prompt information reaches a first preset duration; and determining whether the livestreaming room is still in the preset state after a second preset duration, and in response to the livestreaming room being still in the preset state, returning to perform an operation of displaying in the scrolling manner the prompt information indicating that the livestreaming room is in the preset state.

10. The method according to claim 8, further comprising:

determining whether a preset like vibration switch is turned on in response to a like trigger operation for a current livestreaming room; and controlling a current terminal device to vibrate in response to the preset like vibration switch being turned on.

11. The method according to claim 1, wherein the preset state comprises a like boost state; and the livestreaming room is in the like boost state when a like object number in the livestreaming room at a same moment reaches a preset like object number threshold.

12. The method according to claim 11, further comprising:

adjusting, when the livestreaming room is in the like boost state, the preset like object number threshold every third preset duration to obtain an adjusted preset like object number threshold and determining whether the like object number in the livestreaming room at a current moment reaches the adjusted preset like object number threshold, and maintaining the like boost state of the livestreaming room in response to the like object number in the livestreaming room at the current moment reaching the adjusted preset like object number threshold; and ending the like boost state of the livestreaming room in response to the like object number in the livestreaming room at the current moment not reaching the adjusted preset like object number threshold.

13. The method according to claim 1, further comprising:

determining whether a preset like vibration switch is turned on in response to a like trigger operation for a current livestreaming room; and controlling a current terminal device to vibrate in response to the preset like vibration switch being turned on.

14. A non-transitory computer-readable storage medium, the non-transitory computer-readable storage medium storing a computer program, wherein when the computer program is executed by a processor, the interface display method according to claim 1 is implemented.

15. An interface display method, applied to a first client or a second client, and the method comprising:

generating, during a first period when a livestreaming room is in a preset state, an animation corresponding to the preset state, wherein the animation is an effect animation for representing a like popularity of the livestreaming room, and the animation is different from an animation displayed during a second period when the livestreaming room is not in the preset state;

displaying the animation corresponding to the preset state;

determining association information of a target object corresponding to the livestreaming room; and displaying the association information of the target object in the animation corresponding to the preset state;

wherein the target object is at least one object whose number of likes reaches a preset like number threshold or whose number of likes is highest, and the association information comprises at least one selected from a group comprising an identification of the target object and a number of likes corresponding to the target object.

16. The method according to claim 15, further comprising:

in response to receiving a trigger operation for the association information, determining at least one selected from a group comprising attribute information of the target object corresponding to the association information and a follow control for following the target object corresponding to the association information; and displaying at least one selected from the group comprising the attribute information and the follow control.

17. The method according to claim 15, wherein at least one of the animation corresponding to the preset state and the animation displayed during the second period is a drifting like animation.

18. A computer device, comprising a memory and a processor, wherein the memory stores a computer program executable on the processor, when the processor executes the computer program to implement:

during a first period when a livestreaming room is in a preset state, in response to receiving an interaction trigger operation for the livestreaming room, determine, according to actual interaction information corresponding to the interaction trigger operation, target interaction information corresponding to the preset state, wherein in the preset state, the target interaction information is different from the actual interaction information corresponding to the interaction trigger operation;

based on the target interaction information, generate an interaction effect corresponding to the preset state, and display the interaction effect;

determine association information of a target object corresponding to the livestreaming room; and display the association information of the target object;

wherein the target object is at least one object whose number of likes reaches a preset like number threshold or whose number of likes is highest, and the association information comprises at least one selected from a group comprising an identification of the target object and a number of likes corresponding to the target object.

* * * * *